United States Patent
Kang

(10) Patent No.: US 12,508,088 B2
(45) Date of Patent: Dec. 30, 2025

(54) SELECTIVELY AUTOMATED ROBOTIC SURGICAL SYSTEM

(71) Applicant: MAKO Surgical Corp., Weston, FL (US)

(72) Inventor: Hyosig Kang, Weston, FL (US)

(73) Assignee: MAKO Surgical Corp., Weston, FL (US)

( * ) Notice: Subject to any disclaimer, the term of this patent is extended or adjusted under 35 U.S.C. 154(b) by 178 days.

(21) Appl. No.: 18/238,086

(22) Filed: Aug. 25, 2023

(65) Prior Publication Data

US 2024/0065783 A1     Feb. 29, 2024

Related U.S. Application Data

(60) Provisional application No. 63/401,298, filed on Aug. 26, 2022.

(51) Int. Cl.
 *A61B 34/30* (2016.01)
 *A61B 17/14* (2006.01)
 (Continued)

(52) U.S. Cl.
 CPC ............... *A61B 34/30* (2016.02); *A61B 17/14* (2013.01); *A61B 34/10* (2016.02); *A61B 34/25* (2016.02);
 (Continued)

(58) Field of Classification Search
 CPC ......... A61B 34/30; A61B 17/14; A61B 34/10; A61B 34/25; A61B 34/74; A61B 34/76;
 (Continued)

(56) References Cited

U.S. PATENT DOCUMENTS

| 7,725,162 B2 | 5/2010 | Malackowski et al. |
| 8,010,180 B2 | 8/2011 | Quaid et al. |

(Continued)

FOREIGN PATENT DOCUMENTS

| WO | 2022055980 A1 | 3/2022 |
| WO | 2022094090 A1 | 5/2022 |

OTHER PUBLICATIONS

Partial International Search Report for Application No. PCT/US2023/031164 dated Dec. 18, 2023, 2 pages.

*Primary Examiner* — Bhavesh V Amin
(74) *Attorney, Agent, or Firm* — Howard & Howard Attorneys PLLC

(57) ABSTRACT

Robotic surgical systems and methods for resection of an anatomy. The system includes a cutting tool, a manipulator configured to move the cutting tool, and a control system. The control system associates a target plane with the anatomy, the target plane delineating a portion of the anatomy to be resected from a portion of the anatomy to remain unresected. The control system controls the manipulator to align the cutting tool to the target plane. The control system controls the manipulator in an automated mode to perform at least one of the following actions: automatically resect along the target plane with the cutting tool, automatically retract the cutting tool along the target plane, and automatically change a pose of the cutting tool on the target plane. The user or control system can pre-assign whether to perform any of the actions in the manual or automated mode.

20 Claims, 11 Drawing Sheets

(51) Int. Cl.
*A61B 34/00* (2016.01)
*A61B 34/10* (2016.01)

(52) U.S. Cl.
CPC .............. *A61B 34/74* (2016.02); *A61B 34/76* (2016.02); *A61B 2034/107* (2016.02)

(58) Field of Classification Search
CPC ... A61B 2034/107; A61B 17/16; A61B 34/20; A61B 34/32; A61B 2034/2055
See application file for complete search history.

(56) References Cited

U.S. PATENT DOCUMENTS

| | | | |
|---|---|---|---|
| 9,119,655 B2 | 9/2015 | Bowling et al. | |
| 9,486,226 B2* | 11/2016 | Chao | A61B 17/157 |
| 9,566,122 B2 | 2/2017 | Bowling et al. | |
| 9,603,665 B2 | 3/2017 | Bowling et al. | |
| 9,833,254 B1* | 12/2017 | Barral | A61B 17/320068 |
| 10,667,868 B2 | 6/2020 | Malackowski | |
| 11,337,766 B2 | 5/2022 | Elbanna et al. | |
| 11,684,374 B2* | 6/2023 | Kang | A61B 34/32 606/82 |
| 12,035,921 B2* | 7/2024 | Kang | A61B 90/37 |
| 2008/0010705 A1 | 1/2008 | Quaid et al. | |
| 2011/0082587 A1* | 4/2011 | Ziaei | A61B 17/162 700/260 |
| 2012/0330429 A1 | 12/2012 | Axelson, Jr. et al. | |
| 2014/0180290 A1 | 6/2014 | Otto et al. | |
| 2017/0258526 A1* | 9/2017 | Lang | A61B 17/1742 |
| 2017/0348007 A1 | 12/2017 | Shiels | |
| 2018/0014891 A1 | 1/2018 | Krebs et al. | |
| 2018/0303561 A1* | 10/2018 | McCabe | A61B 90/361 |
| 2018/0325608 A1* | 11/2018 | Kang | A61B 34/76 |
| 2019/0083191 A1* | 3/2019 | Gilhooley | A61B 17/155 |
| 2019/0090966 A1* | 3/2019 | Kang | A61B 17/1671 |
| 2019/0159848 A1* | 5/2019 | Quaid | A61B 34/37 |
| 2019/0380788 A1 | 12/2019 | Becker et al. | |
| 2019/0380792 A1* | 12/2019 | Poltaretskyi | G06F 3/0482 |
| 2020/0323540 A1* | 10/2020 | Kang | A61B 34/32 |
| 2020/0323594 A1* | 10/2020 | Quaid, III | A61B 34/20 |
| 2020/0367980 A1 | 11/2020 | Forstein et al. | |
| 2021/0068845 A1* | 3/2021 | Schers | A61B 17/02 |
| 2021/0192759 A1* | 6/2021 | Lang | A61B 34/10 |
| 2021/0196289 A1* | 7/2021 | Fischler | A61B 17/1703 |
| 2021/0205032 A1 | 7/2021 | Saeidi et al. | |
| 2021/0361295 A1 | 11/2021 | Lavallee et al. | |
| 2022/0233251 A1 | 7/2022 | Bowling et al. | |
| 2023/0248371 A1* | 8/2023 | Kang | A61B 34/10 606/82 |
| 2024/0065783 A1* | 2/2024 | Kang | A61B 34/74 |
| 2024/0285287 A1* | 8/2024 | Kang | A61B 34/30 |

* cited by examiner

| Key |
|---|
| M = Manual<br>A = Automated |

| Action/Mode Combination Example | Manual/Automated Surgical Actions for the Saw | | | |
|---|---|---|---|---|
| | Alignment of Tool to Target Plane | Resection Cut with Tool Along Target Plane | Retraction of Tool Along Target Plane | Changing Pose (Position and/or Orientation) of Tool Relative to Target Plane |
| 1 | M | M | M | M |
| 2 | A | A | A | A |
| 3 | M | A | A | A |
| 4 | A | M | M | A |
| 5 | A | A | A | A |
| 6 | A | A | A | M |
| 7 | M | M | M | A |
| 8 | M | A | A | A |
| 9 | M | A | A | M |
| 10 | A | M | A | A |
| 11 | A | M | M | M |
| 12 | A | A | M | M |
| 13 | M | M | M | A |
| 14 | M | M | A | M |
| 15 | M | A | M | M |
| 16 | A | M | M | M |

FIG. 5

SELECTIVELY AUTOMATED ROBOTIC SURGICAL SYSTEM

CROSS-REFERENCE TO RELATED APPLICATIONS

The subject application claims priority to and all the benefits of U.S. Provisional Patent App. No. 63/401,298, filed Aug. 26, 2022, the entire contents of which are hereby incorporated by reference.

TECHNICAL FIELD

The disclosure relates to selectively automated robotic cutting systems and methods of use thereof.

BACKGROUND

Surgical saws are commonly utilized in total knee arthroplasty (TKA) to resect the femur and tibia to remove diseased tissue. A TKA procedure typically involves using the saw to make at least five planar cuts to the femur to receive a femoral implant and one planar cut on the tibia to receive a tibial implant. There are several manual actions that the surgeon typically must perform with the saw to execute the procedure. These manual actions include aligning the saw to the plane of the cut, performing the resection cut with the saw along the plane, retracting the saw along the plane, and changing the pose of the saw relative to the plane.

The accuracy of the cuts must be executed with great precision to enable the resected bone to fit the respective implants. Another complication of the TKA procedure is the presence of four major ligaments (PCL, ACL, MCL, LCL), which surround the surgical site of the knee region. When making the femoral and tibial cuts, a surgeon must exercise caution to avoid accidental cutting of the surrounding soft tissue/ligaments. Hence, the surgical workflow involved with making the several cuts of the TKA procedure is intensive and laborious on the surgeon and operating staff. Furthermore, manually performing the several cuts can increase the duration of the surgical procedure. In turn, the duration for which the patient is under anesthesia is undesirably increased.

There are several prior techniques to perform a TKA procedure. One technique involves using a general or patient specific cutting jig with slots for the saw to guide the surgeon to manually perform each of the cuts. Producing and setting up such jigs adds significant cost and delay to the surgical procedure. Furthermore, the surgeon must manually move the saw to each respective plane and perform the cut actions manually, which exposes the procedure to the above challenges. Additionally, manual cuts are susceptible to skiving, whereby the cutting tool deflects or slides away from the intended bone to be cut.

Another technique involves using a robotic system to perform TKA, whereby a robotic manipulator assists the user with manually executing the actions. For example, one robotic device is attached to the surgical site and robotically moves a slotted cut guide from plane to plane. The user then manually performs each cut with a hand-held powered saw. However, this technique nevertheless requires the surgeon to manually perform all the cutting actions.

Other robotic systems have attempted to improve the procedure by utilizing a robotic arm that supports a passive planar linkage with a powered saw attached to the distal end of the passive planar linkage. The robotic arm aligns the saw to the cutting plane and the passive planar linkage mechanically constraints the trajectory of the saw blade to be on the cutting plane. Thereafter, the user manually moves the saw blade towards the bone causing the passive planar linkage to extend to enable the saw to make the cut on plane. Although this technique automates the alignment process, the user is nevertheless required to manually perform all other actions involved with making cuts, which suffer from the above drawbacks. Thus, this technique still requires a significant amount of labor, time, manual precision to avoid accidental cuts, and duration of procedure. Furthermore, such robotic systems provide little flexibility to allow the surgeon to change how the system operates to alleviate the aforementioned concerns.

As such, there remains a need in the art to provide robotic systems and methods to provide a solution for at least some of the technical problems described above.

SUMMARY

This Summary introduces a selection of concepts in a simplified form that are further described below in the Detailed Description below. This Summary is not intended to limit the scope of the claimed subject matter nor identify key features or essential features of the claimed subject matter.

In a first aspect, a robotic surgical system for resection of an anatomy is provided. The robotic surgical system includes: a cutting tool; a manipulator configured to move the cutting tool; and a control system being configured to: associate a target plane with the anatomy, the target plane delineating a portion of the anatomy to be resected from a portion of the anatomy to remain unresected; and control the manipulator to align the cutting tool to a target plane; and control the manipulator in an automated mode to perform at least one of the following: automatically resect along the target plane with the cutting tool; automatically retract the cutting tool along the target plane; and automatically change a pose of the cutting tool on the target plane.

In a second aspect, a method of operating the robotic surgical system of the first aspect is provided.

In a third aspect, a robotic surgical system for resection of an anatomy is provided. The robotic surgical system includes: a cutting tool; a manipulator configured to move the cutting tool; and a control system being configured to: associate a target plane with the anatomy, the target plane delineating a portion of the anatomy to be resected from a portion of the anatomy to remain unresected; and control the manipulator in an automated mode to: automatically align the cutting tool to a target plane; automatically resect the anatomy along the target plane with the cutting tool; automatically retract the cutting tool along the target plane; and automatically change a pose of the cutting tool on the target plane.

In a fourth aspect, a method of operating the robotic surgical system of the third aspect is provided.

In a fifth aspect, a robotic surgical system for resection of an anatomy is provided. The robotic surgical system includes: a cutting tool; a manipulator configured to move the cutting tool; and a control system being configured to: associate a target plane with the anatomy, the target plane delineating a portion of the anatomy to be resected from a portion of the anatomy to remain unresected; and control the manipulator in an automated mode to perform at least one of the following: automatically align the cutting tool to a target plane; automatically resect the anatomy along the target plane with the cutting tool; and automatically retract the cutting tool along the target plane; and control the manipulator in a manual mode to change a pose of the cutting tool on the target plane.

In a sixth aspect, a method of operating the robotic surgical system of the fifth aspect is provided.

In a seventh aspect, a robotic surgical system for resection of an anatomy is provided. The robotic surgical system comprising: a cutting tool; a manipulator configured to move the cutting tool; a control system configured to: associate a target plane with the anatomy, the target plane delineating a portion of the anatomy to be resected from a portion of the anatomy to remain unresected; and control the manipulator to move the cutting tool in one or both of a manual mode and an automated mode to perform one or more action(s) including: align the cutting tool to the target plane; resect the anatomy along the target plane with the cutting tool; retract the cutting tool along the target plane; and change the pose of the cutting tool on the target plane; and a user interface coupled to the control system, wherein the user interface is configured to enable an operator to selectively pre-assign whether to perform the one or more action(s) in the manual mode or the automated mode.

In an eighth aspect, a method of operating the robotic surgical system of the seventh aspect is provided.

In a ninth aspect, a non-transitory computer readable medium or computer program product is provided, comprising instructions, which when executed by one or more processors, implement the user interface of the seventh aspect to enable an operator to selectively pre-assign whether to perform the one or more action(s) in the manual mode or the automated mode.

In a tenth aspect, a robotic surgical system is provided. The robotic surgical system includes: a cutting tool; a manipulator configured to support the cutting tool; a user interface; and a control system being configured to: control the manipulator to move the cutting tool to perform a plurality of different actions; and receive an input from the user interface to selectively pre-assign whether to perform one or more the plurality of different action(s) in a manual mode of operation or an automated mode of operation.

In an eleventh aspect, a method of operating the robotic surgical system of the tenth aspect is provided.

In a twelfth aspect, a robotic surgical system is provided for resection of an anatomy, the robotic surgical system comprising: a cutting tool; a manipulator configured to move the cutting tool; a control system configured to: associate a target plane with the anatomy, the target plane delineating a portion of the anatomy to be resected from a portion of the anatomy to remain unresected; control the manipulator to move the cutting tool in one or both of a manual mode and an automated mode to perform actions including: align the cutting tool to the target plane; resect the anatomy along the target plane with the cutting tool; retract the cutting tool along the target plane; and change a pose of the cutting tool on the target plane; automatically pre-assign whether to perform one or more of the actions in the manual mode or the automated mode; and control the manipulator to move the cutting tool to perform one or more of the actions according to the pre-assigned mode.

In a thirteenth aspect, a method of operating the robotic surgical system of the twelfth aspect is provided.

In a fourteenth aspect, a robotic surgical system is provided, comprising: a cutting tool; a manipulator configured to move the cutting tool; and a control system being configured to: obtain a plurality of actions to be performed by the manipulator moving the cutting tool; selectively pre-assign whether to perform one or more of the actions in a manual mode of operation or an automated mode of operation; and control the manipulator to move the cutting tool to perform one or more of the actions according to the pre-assigned mode.

In a fifteenth aspect, a method of operating the robotic surgical system of the fourteenth aspect is provided.

In a sixteenth aspect, a robotic surgical system is provided for resection of an anatomy, the robotic surgical system comprising: a cutting tool; a manipulator configured to move the cutting tool; a control system configured to: associate a target plane with the anatomy, the target plane delineating a portion of the anatomy to be resected from a portion of the anatomy to remain unresected; and control the manipulator to move the cutting tool in an automated mode to perform one or more actions including: align the cutting tool to the target plane; resect the anatomy along the target plane with the cutting tool; retract the cutting tool along the target plane; and change a pose of the cutting tool on the target plane; and a user interface coupled to the control system, wherein the user interface is configured to enable an operator to selectively pre-assign, for any one or more of the actions, a feed rate for the cutting tool.

In a seventeenth aspect, a method of operating the robotic surgical system of the sixteenth aspect is provided.

In an eighteenth aspect, a robotic surgical system is provided, comprising: a surgical saw configured to cut a bone; a manipulator configured to move the surgical saw; and a control system being configured to: associate a target plane with the bone, the target plane delineating a portion of the bone to be resected from a portion of the bone to remain unresected; control the manipulator to align the surgical saw with the target plane; control the manipulator in an automated mode to automatically cut the bone along the target plane with the surgical saw to initially enter a cortical surface of the bone according to a first feed rate; and after initially entering the cortical surface with the surgical saw, control the manipulator to resect the bone along the target plane with the surgical saw according to a second feed rate that is faster than the first feed rate.

In a nineteenth aspect, a method of operating the robotic surgical system of the eighteenth aspect is provided.

In a twentieth aspect, aa robotic surgical system is provided comprising: a cutting tool; a manipulator configured to support the cutting tool; and a control system being configured to: control the manipulator in either an automated mode or manual mode to perform an action from among a plurality of different actions; detect occurrence of a predefined behavior of the cutting tool during performance of the action; and in response to detection of the predefined behavior, control the manipulator to automatically switch to a different action.

In a twenty-first aspect, a method of operating the robotic surgical system of the twentieth aspect is provided.

Any of the above aspects can be combined in part or in whole.

For any of the above aspects, any one or more of the following implementations are contemplated, individually or in combination:

The control system may associate a target perimeter with the anatomy. The target perimeter may be located within the target plane. The target perimeter may correspond to a perimeter of a portion of the anatomy. The control system may associate a virtual boundary with the anatomy. The virtual boundary may be located within the target plane. The virtual boundary may be based on the target perimeter. The manipulator may be configured to resect along the target plane with the cutting tool when the cutting tool is located within the virtual boundary. The manipulator may be configured to cease resection with the cutting tool, deactivate the cutting tool, or retract the cutting tool along the target plane when the cutting tool meets or exceeds the virtual boundary.

The control system may be configured to: control the manipulator in a manual mode to align the cutting tool to a target plane; and control the manipulator in the automated mode to: automatically resect the anatomy along the target plane with the cutting tool; automatically retract the cutting tool along the target plane; and automatically change a pose of the cutting tool on the target plane.

The control system may be configured to: control the manipulator in a manual mode to resect the anatomy along the target plane with the cutting tool; and control the manipulator in an automated mode to: automatically align the cutting tool to a target plane; automatically retract the cutting tool along the target plane; and automatically change a pose of the cutting tool on the target plane.

The control system may be configured to: control the manipulator in a manual mode to retract the cutting tool along the target plane; and control the manipulator in an automated mode to: automatically align the cutting tool to a target plane; automatically resect the anatomy along the target plane with the cutting tool; and automatically change a pose of the cutting tool on the target plane.

The control system may be configured to: control the manipulator in a manual mode to: align the cutting tool to a target plane; and resect the anatomy along the target plane with the cutting tool; and control the manipulator in an automated mode to: automatically retract the cutting tool along the target plane; and automatically change a pose of the cutting tool on the target plane.

The control system may be configured to: control the manipulator in a manual mode to: align the cutting tool to a target plane; and retract the cutting tool along the target plane; and control the manipulator in an automated mode to: automatically resect the anatomy along the target plane with the cutting tool; and automatically change a pose of the cutting tool on the target plane.

The control system may be configured to: control the manipulator in a manual mode to: align the cutting tool to a target plane; and change a pose of the cutting tool on the target plane; and control the manipulator in an automated mode to: automatically resect the anatomy along the target plane with the cutting tool; and automatically retract the cutting tool along the target plane.

The control system may be configured to: control the manipulator in a manual mode to: resect the anatomy along the target plane with the cutting tool; and retract the cutting tool along the target plane; and control the manipulator in an automated mode to: automatically align the cutting tool to a target plane; and automatically change a pose of the cutting tool on the target plane.

The control system may be configured to: control the manipulator in a manual mode to: resect the anatomy along the target plane with the cutting tool; and change a pose of the cutting tool on the target plane; and control the manipulator in an automated mode to: automatically align the cutting tool to a target plane; and automatically retract the cutting tool along the target plane.

The control system may be configured to: control the manipulator in a manual mode to: retract the cutting tool along the target plane; and change a pose of the cutting tool on the target plane; and control the manipulator in an automated mode to: automatically align the cutting tool to a target plane; and automatically resect the anatomy along the target plane with the cutting tool.

The control system may be configured to: control the manipulator in a manual mode to: align the cutting tool to a target plane; resect the anatomy along the target plane with the cutting tool; and retract the cutting tool along the target plane; and control the manipulator in an automated mode to automatically change a pose of the cutting tool on the target plane.

The control system may be configured to: control the manipulator in a manual mode to: align the cutting tool to a target plane; resect the anatomy along the target plane with the cutting tool; and change a pose of the cutting tool on the target plane; and control the manipulator in an automated mode to automatically retract the cutting tool along the target plane.

The control system may be configured to: control the manipulator in a manual mode to: align the cutting tool to a target plane; retract the cutting tool along the target plane; and change a pose of the cutting tool on the target plane; and control the manipulator in an automated mode to automatically resect the anatomy along the target plane with the cutting tool.

The control system may be configured to: control the manipulator in the automated mode by automatically moving the cutting tool along a predetermined tool path. A force/torque sensor may be configured to sense forces/torques applied to the cutting tool by an operator, and the control system controls the manipulator in the manual mode by being configured to command movement of the cutting tool in response to the sensed forces/torques.

The control system may be configured to: control the manipulator in the automated mode to automatically cut the bone along the target plane with the surgical saw to initially enter the cortical surface of the bone according to the first feed rate until a predetermined depth is reached by the surgical saw. After the predetermined depth is reached, the control system may be configured to control the manipulator to resect the bone along the target plane with the surgical saw according to a second feed rate. A sensing system may be configured to detect a characteristic of the bone, and wherein the control system is configured to: control the manipulator in the automated mode to automatically cut the bone along the target plane with the surgical saw to initially enter the cortical surface of the bone according to the first feed rate; determine from the sensing system that the surgical saw has breached the cortical surface of the bone; and in response to detection of breach of the cortical bone, control the manipulator to resect the bone along the target plane with the surgical saw according to the second feed rate.

A user interface may be coupled to the control system and wherein the user interface is configured to enable an operator to selectively assign manual mode control or automated mode control. The selective assignment of mode may be to perform at least one of the following actions: align the cutting tool to the target plane; resect the anatomy along the target plane with the cutting tool; retract the cutting tool along the target plane; and change the pose of the cutting tool on the target plane. The selective action/mode assignment could apply to all planar resections of the surgical procedure. The selective action/mode assignment could be chosen for individual planar resections of the surgical procedure. The selective action/mode assignment could be preoperatively or intraoperatively determined. The selective action/mode assignment may be based on a surgical plan. The selective action/mode assignment may be for actions specifically related to total hip surgery, partial knee surgery, shoulder surgery, spine surgery, or trauma surgery. Any of the actions can include sub-steps or sub-actions. The selective action/mode assignment may be for the sub-steps or sub-actions for any of the described actions. The user can select a feed rate for any of the described actions, or for any or each sub-step for any described action. The control system is configured to automatically and selectively pre-assign manual mode control or automated mode control to perform any of the described actions. The user interface may be provided on an extended reality, augmented reality, or mixed reality display device that is worn by the user.

The action may include one of the following: align the cutting tool to the target plane; resect along the target plane with the cutting tool; retract the cutting tool along the target plane; and change a pose of the cutting tool on the target plane. The different action may include a different one of the following: align the cutting tool to the target plane; resect along the target plane with the cutting tool; retract the cutting tool along the target plane; and change a pose of the cutting tool on the target plane. The control system may control the manipulator in the manual mode to perform the action; detect occurrence of the predefined behavior during performance of the action in the manual mode; and in response to detection of the predefined behavior, control the manipulator to automatically switch to the different action and automatically switch from the manual mode to the automated mode. The predefined behavior may include at least one of the following: a collision between the cutting tool and a virtual boundary; a changing of direction of the cutting tool; and the cutting tool removing a predefined amount of material from the target plane.

The manipulator may include an arm formed of a plurality of links and joints. The manipulator may be hand-held (against the force of gravity) and include a grasping portion and a moveable portion that includes joints and actuators to move the moveable portion relative to the grasping portion. The resection may be for a total knee procedure. The resection may involve one or more cuts of the total knee procedure, including a cut on the femur and/or tibia. The resection may be for a revision procedure or the resection may be for a shoulder procedure, such as, but not limited to a stemless shoulder procedure or reverse or anatomical shoulder arthroplasty procedure. The cutting tool may be a planar cutting tool. The cutting tool may be a surgical saw. The cutting tool may be a side cutting bur or a router.

Any of the above implementations are contemplated, individually or in combination.

BRIEF DESCRIPTION OF THE DRAWINGS

Advantages of the present disclosure will be readily appreciated as the same becomes better understood by reference to the following detailed description when considered in connection with the accompanying drawings wherein:

FIG. 5 is a table detailing actions that can be performed by the robotic cutting system with the cutting tool using a manual mode, an automated mode, and/or combinations thereof, according to one example;

DETAILED DESCRIPTION

I. System Overview

Figure 1:
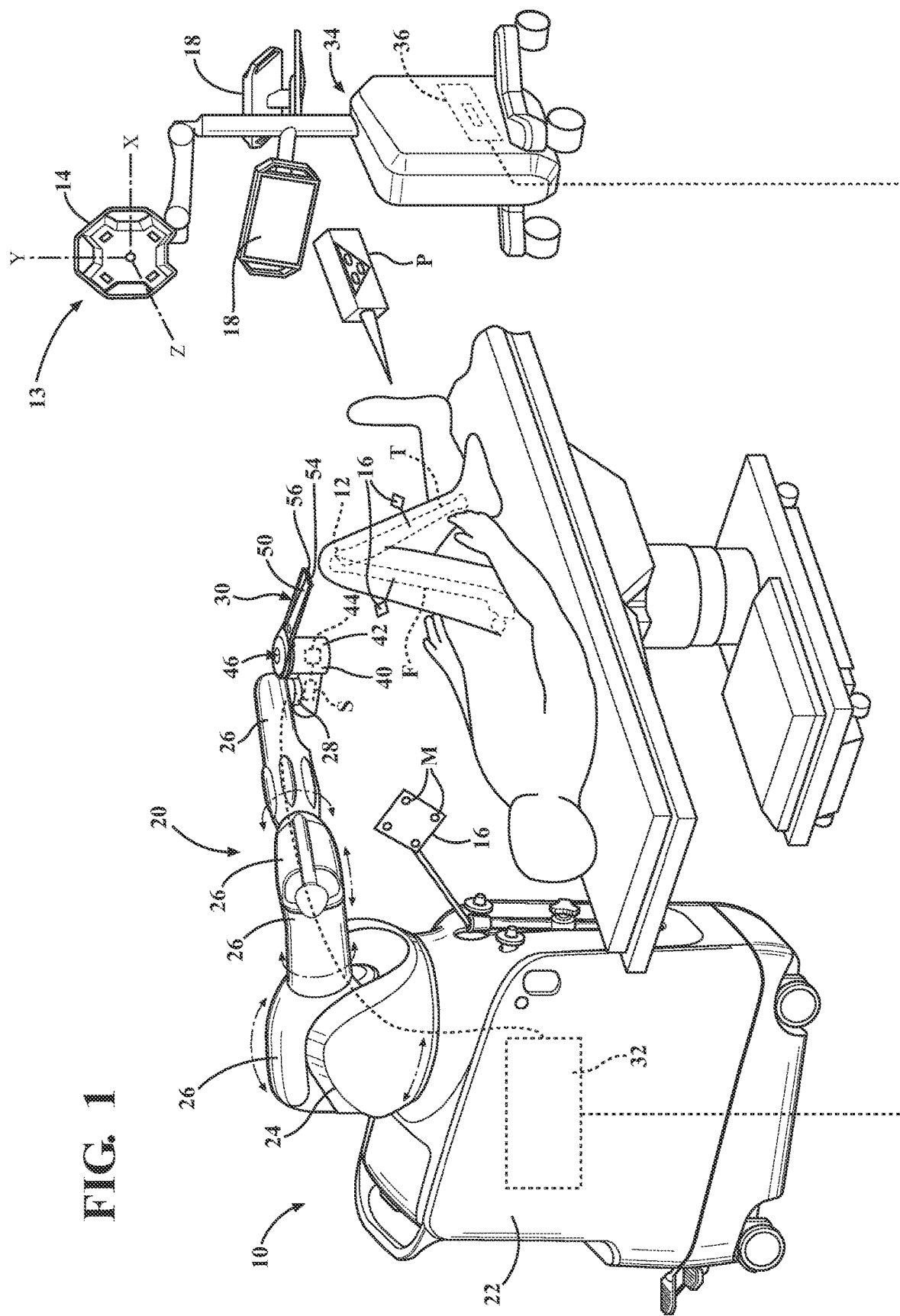
FIG. 1 is a perspective view of a robotic cutting system in an operating room, according to one implementation.

Referring to the Figures, a robotic cutting system 10 is shown for use during surgical procedures. Typically, the surgical procedure will include the cutting of a surgical site 12, such as hard tissue (bone), soft tissue, or the like. In some implementations, the surgical procedure involves a total knee procedure. In other implementations, the surgical procedure involves a partial knee procedure, partial or total hip replacement, shoulder replacement surgery, such as stemless or reverse shoulder arthroplasty, trauma surgeries, spine surgery, or any type of revision surgery from the prior mentioned procedures. The surgical procedures may be any other type of procedure requiring the use of a cutting instrument.

The robotic cutting system 10 is designed to cut away material. In some cases, the material (e.g., bone) is to be replaced by surgical implants such as hip, knee, shoulder, and spine implants, including unicompartmental, bicompartmental, or total knee implants, acetabular cups, femoral stems, humeral implants, and the like. Some of these types of implants are disclosed in U.S. Patent Application Publication No. 2012/0330429, entitled, "Prosthetic Implant and Method of Implantation," the entire disclosure of which is hereby expressly incorporated by reference herein. It should be appreciated that the systems and methods disclosed herein may be used to perform other procedures, surgical or non-surgical, or may be used in industrial applications or other applications.

The robotic cutting system 10 may include a navigation system 13 including a localizer 14 and tracking devices 16, one or more displays 18, and a robotic manipulator 20 comprising a robotic arm. The manipulator 20 has a base 22 and the robotic arm may include a base link 24 rotatably coupled to the base 22 and a plurality of arm links 26 serially extending from the base link 24 to a distal end 28. The arm links 26 pivot/rotate about a plurality of joints in the robotic arm. The manipulator 20 may have a serial arm configuration, as shown, a parallel link configuration, or the system may employ more than one robotic arm.

A cutting tool 30, or end effector, is coupled or attachable to the distal end 28 of the manipulator 20. The manipulator 20 may be capable of moving the cutting tool 30 in multiple degrees of freedom, e.g., five or six degrees of freedom. In some instances, one or more of the links 26 may be passively moved by the physical force of the user. Such links may operate as a planar mechanism, which mechanically restricts movement of the joint(s) to be along a plane.

In the several examples described herein, the cutting tool 30 is a saw blade 50, hence, these terms may be used interchangeably throughout the description. The saw blade 50 is actuated or powered such that the saw blade 50 oscillates to perform tissue cuts. The saw blade 50 may be of any size, shape, or type (e.g., straight blade, crescent blade, etc.). In some implementations, the saw blade 50 is formed from a single piece of material, such as metal, by stamping and/or machining. The saw blade 50 may be configured to create a kerf with a generally flat face or may be configured to provide a kerf with a rounded profile. The cutting tool 30 and associated saw blade 50 may be like that described in U.S. Patent Application Pub. No. 2017/0348007, filed on Jun. 2, 2017, entitled "Surgical Saw and Saw Blade for use therewith," which is hereby incorporated herein by reference. The cutting tool 30 and associated saw blade 50 may also be like that described in U.S. Patent Application Pub. No. 2014/0180290, filed on Dec. 21, 2012, entitled "Systems and Methods for Haptic Control of a Surgical Tool," which is hereby incorporated herein by reference.

Figure 2:
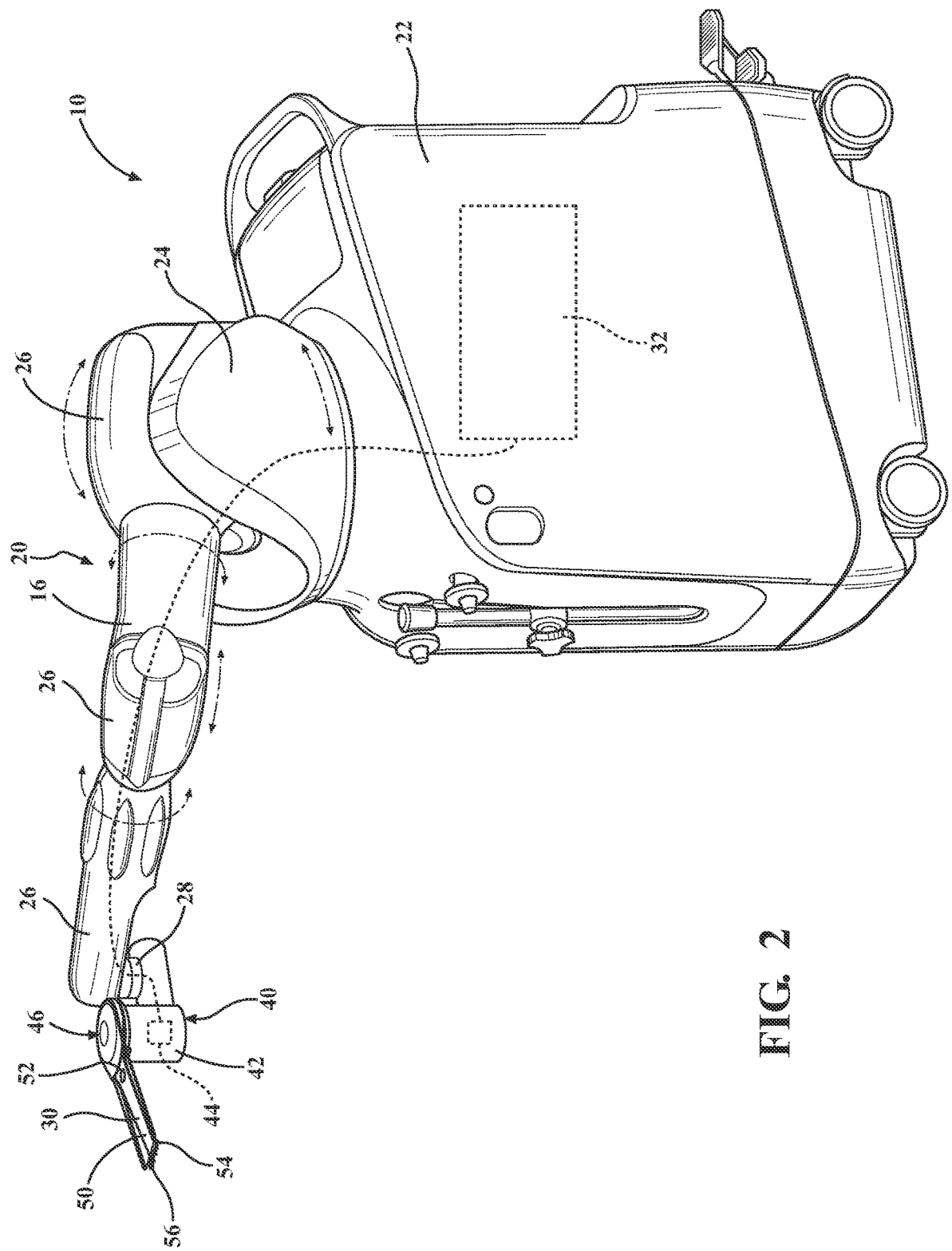
FIG. 2 is a perspective view of an example manipulator of the robotic cutting system supporting a cutting tool.

In some implementations, such as the implementation illustrated in FIG. 2, the cutting tool 30 includes a coupler 40 having a housing 42 for attaching to the robotic manipulator 20. It is also contemplated that a separate motor 44 may be located in the housing 42 of the coupler 40. The motor 44 may be of any suitable type to operate the cutting tool 30, including but not limited to a pneumatic or electrical motor. The motor 44 is configured, for instance, to provide oscillating motion to the saw blade 50 of the cutting tool 30 during the surgical procedure. The motor 44 may provide cyclical linear motion and/or cyclical angular motion, such as used for an oscillating sagittal saw. In some implementations, the cutting tool 30 may include a drive hub 46 coupled to the motor 44. The saw blade 50 may include an attachment portion 52 configured to be removably coupled to the housing 42. Opposite the attachment portion 52, the saw blade 50 includes a cutting portion 54 which has a plurality of teeth 56.

While a saw blade 50 has been described as one example of the cutting tool 30, other cutting tools may be utilized to perform any of the techniques described herein. For example, the cutting tool 30 may be a cutting bur (such as a side-cutting bur), a router, a pressurized water cutting system, a laser cutting system, a steerable wire passer and wire saw guide, or the like.

A robotic controller 32, which forms part or all of a control system 32, 36, is coupled to the robotic manipulator 20 to provide control of the manipulator 20 or guidance to the surgeon during manipulation of the cutting tool 30. In one implementation, the robotic controller 32 is configured to control the manipulator 20 (e.g., joint motors thereof) to provide haptic feedback to the operator via the manipulator 20. This haptic feedback helps to constrain or inhibit the surgeon from manually manipulating (e.g., moving) the cutting tool 30 beyond predefined virtual boundaries associated with the surgical procedure. Such a haptic feedback system and associated haptic objects that define the virtual boundaries are described, for example, in U.S. Pat. No. 8,010,180, which is hereby incorporated by reference herein in its entirety. In one implementation, the robotic cutting system 10 comprises the RIO™ Robotic Arm Interactive Orthopedic System manufactured by MAKO Surgical Corp.

In some implementations, the manipulator 20 acts autonomously based on predefined tool paths and/or other predefined movements to perform the surgical procedure. Such movements may be defined during the surgical procedure and/or before the procedure. In further implementations, a combination of manual and automated control is utilized. For example, a robotic system that employs both a manual mode in which an operator manipulates the cutting tool 30 by applying force to the cutting tool 30 to cause movement of the manipulator 20 and a semi-automated mode in which the operator holds a pendant to control the manipulator 20 to autonomously follow a tool path is described in U.S. Pat. No. 9,566,122, hereby incorporated by reference herein in its entirety. Additional features and implementations of the manual and automated modes will be described in detail below.

The manipulator 20, in some instances, can be a hand-held robotic manipulator. The hand-held robotic manipulator can support a cutting tool 30, e.g., saw blade 50 or cutting bur, for performing surgical cuts. The hand-held manipulator includes a grasping portion, which is held by the user's hand to support the manipulator against the force of gravity. Coupled to the grasping portion is a moveable portion that includes an actuator system to move the cutting tool 30 in multiple degrees of freedom. The control system 32, 36 can command movement of the actuators to autonomously align and maintain the cutting tool 30 to target planes. In some cases, actuators may be configured to retract the cutting tool 30 linearly or change the orientation of the cutting tool 30. In other cases, the hand-held manipulator may hold the cutting tool 30 static so that the manipulator is effectively operated in a manual manner. One example of a hand-held robotic manipulator supporting a cutting tool can be like that described in International Patent Application No. PCT/US2021/049440, filed Sep. 8, 2021, entitled, "Systems and methods for guiding movement of a handheld medical robotic instrument", the contents of which are hereby incorporated by reference in their entirety.

The navigation system 13 is set up to track movement of various objects in the operating room. Such objects include, for example, the cutting tool 30, the patient's anatomy of interest, e.g., the femur F and tibia T, and/or other objects. The navigation system 13 tracks these objects for purposes of displaying their relative positions and orientations to the surgeon and, in some cases, for purposes of controlling or constraining manual manipulation of the cutting tool 30 relative to virtual boundaries associated with the patient's anatomy.

The navigation system 13 includes a cart assembly 34 that houses a navigation controller 36. In one implementation, the navigation controller 36 and the robotic controller 32 collectively form the control system 32, 36 of the robotic cutting system 10. A navigation interface is in operative communication with the navigation controller 36. The navigation interface includes the displays 18 that are adjustably mounted to the cart assembly 34. Input devices such as a keyboard and mouse can be used to input information into the navigation controller 36 or otherwise select/control certain aspects of the navigation controller 36. Other input devices are contemplated including a touch screen (not shown) or voice-activation. In some instances, one or more of the displays 18 may be implemented using an extended reality, augmented reality, or mixed reality head-mounted display device that is worn by the user. The head-mounted device can display any aspect of the techniques described herein using virtual imagery that is superimposed or overlaid on real-world views or imagery of the surgical site.

The localizer 14 communicates with the navigation controller 36. In the implementation shown, the localizer 14 is an optical localizer and includes a camera unit (one example of a sensing device). The camera unit has an outer casing that houses one or more optical position sensors. In some implementations at least two optical sensors are employed, sometimes three or more. The optical sensors may be separate charge-coupled devices (CCD). The camera unit is mounted on an adjustable arm to position the optical sensors with a field of view of the below discussed tracking devices 16 that, ideally, is free from obstructions. In some implementations the camera unit is adjustable in at least one degree of freedom by rotating about a rotational joint. In other implementations, the camera unit is adjustable about two or more degrees of freedom.

The localizer 14 includes a localizer controller (part of the navigation controller) in communication with the optical sensors to receive signals from the optical sensors. The localizer controller communicates with the navigation controller 36 through either a wired or wireless connection (not shown). One such connection may be an IEEE 1394 interface, which is a serial bus interface standard for high-speed communications and isochronous real-time data transfer. The connection could also use a company specific protocol. In other implementations, the optical sensors communicate directly with the navigation controller 36.

Position and orientation signals and/or data are transmitted to the navigation controller 36 for purposes of tracking the objects. The cart assembly 34, the displays 18, and the localizer 14 may be like those described in U.S. Pat. No. 7,725,162 to Malackowski, et al. issued on May 25, 2010, entitled "Surgery System," hereby incorporated by reference.

The navigation controller 36 can be a personal computer or laptop computer, or any other suitable form of controller. Navigation controller 36 has the displays 18, central processing unit (CPU) and/or other processors, memory (not shown), and storage (not shown). The navigation processors can be any type of processor, microprocessor, or multi-processor system. The navigation controller 36 is loaded with software as described below. The software converts the signals received from the localizer 14 into data representative of the position and orientation of the objects being tracked.

Navigation system 13 includes the plurality of tracking devices 16, also referred to herein as trackers. In the illustrated implementation, trackers 16 are coupled to separate bones of the patient, e.g., the femur F and tibia T. In some cases, the trackers 16 are firmly affixed to sections of bone via bone screws, bone pins, or the like. In other cases, clamps on the bone may be used to attach the trackers 16. In further implementations, the trackers 16 could be mounted to other tissue types or parts of the anatomy. The position of the trackers 16 relative to the anatomy to which they are attached can be determined by registration techniques, such as point-based registration in which a digitizing probe P (e.g., navigation pointer) is used to touch off on bony landmarks on the bone or to touch on several points on the bone for surface-based registration. Conventional registration techniques can be employed to correlate the pose of the trackers 16 to the patient's anatomy, e.g., the bones being treated.

A base tracker 16 is also coupled to the base 22 to track the pose of the cutting tool 30, e.g., when combined with data derived from joint encoders in the joints of the manipulator 20 that partially define the spatial transformation from the base 22 to the distal end 28 of the manipulator 20, and when combined with data describing the location of the cutting tool 30 with respect to the distal end 28. In other implementations, a separate tracker 16 could be fixed to the cutting tool 30, e.g., integrated into the cutting tool 30 during manufacture or may be separately mounted to the cutting tool 30 in preparation for the surgical procedure. In any case, a working end of the cutting tool 30 is being tracked by virtue of the base tracker 16 or other tracker. The working end may be a distal end of an accessory of the cutting tool 30. Such accessories may comprise the saw blade 50.

In the illustrated implementation, the trackers 16 are active trackers. In this implementation, each tracker 16 has at least three active tracking elements or markers M, such as LEDs, for emitting light to the localizer 14 and to the optical sensors. In other embodiments, the trackers 16 may be passive trackers which reflect infrared light to the optical sensors. Based on the received optical signals, navigation controller 36 generates data indicating the relative positions and orientations of the trackers 16 relative to the localizer 14. In some cases, more or fewer markers may be employed. For instance, in cases in which the object being tracked is rotatable about a line, two markers can be used to determine an orientation of the line by measuring positions of the markers at various locations about the line. It should be appreciated that the localizer 14 and trackers 16, although described above as utilizing optical tracking techniques, could alternatively, or additionally, utilize other tracking modalities to track the objects, such as electromagnetic tracking, radio frequency tracking, ultrasound tracking, inertial tracking, machine-vision tracking, combinations thereof, and the like.

II. Surgical Overview

Figure 3:
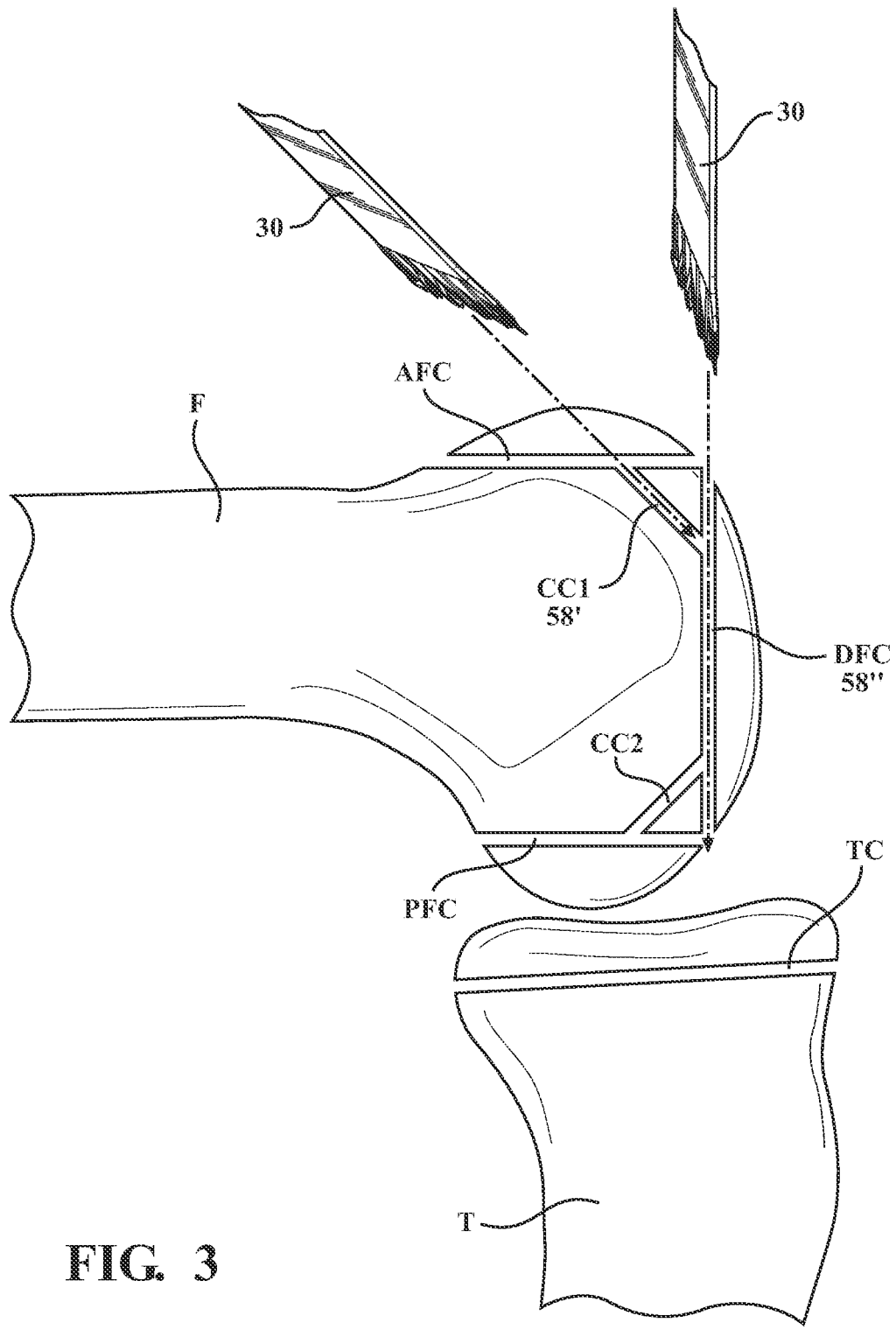
FIG. 3 is a side view of a surgical site including the femur and a tibia of a patient, wherein the robotic cutting system aligns the cutting tool with various target planes associated with the target site, according to one example.

In one instance, the robotic cutting system 10 may be used to perform a knee arthroplasty surgery, and more specifically, a total knee surgery. Referring to FIG. 3, the robotic cutting system 10 may be used to resect the femur F and/or the tibia T. For example, the robotic cutting system 10 may be configured remove damaged cartilage and/or bone of the femur F by performing one or more of an anterior femur cut AFC, a chamfer femur cut CC1, CC2, a distal femur cut DFC, and a posterior femur cut PFC with the cutting tool 30. Additionally, the robotic cutting system 10 may be configured to remove damaged cartilage and/or bone of a tibia T by performing a tibial plateau cut. Any number of cuts may be performed by the surgeon, depending on the requirements of the surgical plan and intended implant.

The robotic cutting system 10 can resect the femur F and/or tibia T by resecting along one or more target planes 58. The target plane 58 is the plane in which a planar cut is to be made with the cutting tool 30. The target plane 58 delineates a portion of the anatomy to be resected from a portion of the anatomy to not be resected. For example, referring to FIG. 4, a portion R of the femur F within the target plane 58 defines a portion of the femur F to be resected by the cutting tool 30. Accordingly, portions of the femur F located outside of the portion R and the target plane 58 are not to be resected by the cutting tool 30 and portions of the femur F located within the portion R and the target plane 58 are to be resected by the cutting tool 30.

The target plane 58 can be a virtual object that is associated with, or registered to, the patient's anatomy. The navigation system 13 can be used to perform this association using any type of registration technique, such as touching a pointer (P) to the surface of the bone, or any other type of image-based or imageless registration process. The target planes 58 can be defined relative to a 3D model of the bone during a surgical planning process. The 3D model of the bone can be registered to the actual bone to virtually position the target plane 58 in the coordinate system of the surgical site. The target plane 58 can be intraoperatively or preoperatively defined and can be updated by the surgeon anytime using the user interfaces.

The target plane(s) 58 may be defined such that resection along the target plane 58 performs the anterior femur cut AFC, the chamfer femur cut CC1, CC2, the distal femur cut DFC, the posterior femur cut PFC, or the tibial plateau cut TC. For example, in FIG. 4, the target plane 58 is positioned such that, when the cutting tool 30 resects along the target plane 58, the cutting tool 30 performs a distal femur cut DFC.

The control system 32, 36 may determine a protective virtual boundary VB, which defines the limits of the anatomy beyond which the cutting tool 30 should not resect. In some instances, the virtual boundary VB may be based on soft tissue locations that are identified using pre-operative or intraoperative images/models (e.g., CT scans, X-ray images, MRI images, 3-D models, etc.) of the patient's anatomy. The control system 32, 36 may be configured to associate the virtual boundary VB with the patient's anatomy, using registration techniques such as those described above. The virtual boundary VB may be entirely or partially located within the target plane 58. A separate virtual boundary VB may be associated each separate the target plane 58. The navigation controller 36 determines the relative location of the cutting tool 30 to the virtual boundary VB. The manipulator 20 may be controlled to enable resection along the target plane 58 with the cutting tool 30 when the cutting tool 30 is located within, or respects, the virtual boundary VB. In other words, the cutting tool 30 can be activated to remove tissue when inside the virtual boundary VB. When the cutting tool 30 meets or exceeds the virtual boundary VB, the manipulator 20 is configured to cease resection along the target plane 58 with the cutting tool 30. A collision with the virtual boundary VB can cause a reactive force to haptically push the cutting tool 30 away from the virtual boundary VB. Additionally, or alternatively, the manipulator 20 can immediately deactivate the cutting tool 30 and/or auto-retract the cutting tool 30 in response to a collision with the virtual boundary VB. The manner of controlling the robotic cutting system 10 based on virtual/haptic objects, such as the virtual boundary VB can be like that described in U.S. Pat. Nos. 8,010,180, 9,119,655 and U.S. Patent Application Pub. No. 2014/0180290, the contents of both of which are hereby incorporated herein by reference in their entirety.

The geometry of the virtual boundary VB may be based on, or uniquely defined for, the type of cut performed by the cutting tool 30 (e.g., an anterior femur cut AFC, a chamfer femur cut CC1, CC2, a distal femur cut DFC, a posterior femur cut PFC, and/or a tibial plateau cut TC). For example, the virtual boundary VB can be defined to delineate the material to be removed for each specific cut. The virtual boundaries VB can be implant specific and/or patient specific. The thickness of the virtual boundary VB may be defined based on the thickness of the target plane 58 or may be thicker than the target plane 58 as an added redundancy measure. The width and depth of the virtual boundary VB may be defined based on the physical width and depth of the respective portion of the anatomy for which a cut will be performed.

Figure 4:
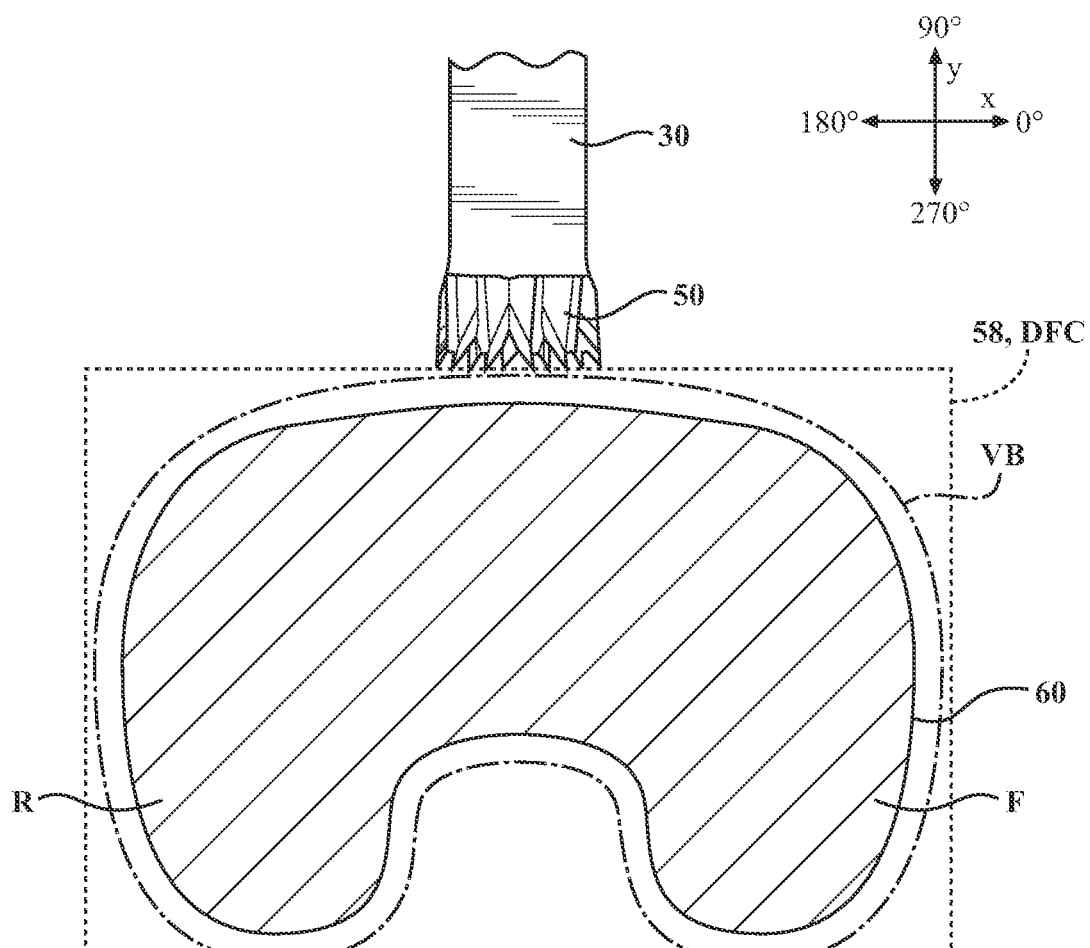
FIG. 4 illustrates the cutting tool shown relative to the femur with a target plane, target perimeter and virtual boundary associated with the femur, according to one example.

In some cases, the virtual boundary VB may be based on a target perimeter 60 associated with the patient's anatomy, as shown in FIG. 4. Specifically, the target perimeter 60 is located within the target plane 58 and corresponds to a planar edge or profile of the bone that would exist after the cut is performed along the target plane 58. The virtual boundary VB may be positioned on the same plane as the target plane 58 and offset a predefined distance past the target perimeter 60. In this way, the cutting tool 30 may remain actuated after breaching the target perimeter 60, but ceases actuation once reaching or exceeding the virtual boundary VB. In some instances, the predefined distance from the target perimeter 60 can be 2 mm, 5 mm, 10 mm, or 15 mm from the target perimeter 60. The offset of the virtual boundary VB from the target perimeter 60 can be defined based on the proximity of soft tissue relative to the target perimeter 60, which can be determined from patient imaging data, modeling, or pointer (P) registration of soft tissue features. The virtual boundaries VB may be offset different distances from the target perimeter 60 depending on the geometry of the cut and soft tissue proximity. The virtual boundary VB may also have a geometry or contour that is based on the geometry of the target perimeter 60.

Any of the target plane 58, the target perimeter 60, and the virtual boundary VB may be defined by points, lines, planes, volumes, or the like, and may be 1-D, 2-D, or 3-D. For example, the target plane 58, the target perimeter 60, and the virtual boundary VB may be defined as models and could be solid models (e.g., built with constructive solid geometry or the like), surface models (e.g., surface mesh, etc.), or any suitable form of 3-D model. Any of the target plane 58, the target perimeter 60, and the virtual boundary VB may be registered pre-operatively or intraoperatively and can be based on patient images/models (e.g., CT scans, X-ray images, MRI images, 3-D models, etc.) of the patient's anatomy that are mapped to the patient's actual anatomy using the navigation system.

III. Manual Mode and Automated Mode

The robotic cutting system 10 may be configured to operate in a manual mode and an automated mode.

In the manual mode, the operator manually directs, and the robotic controller 32 controls, movement of the robotic manipulator 20 and, in turn, the cutting tool 30 at the surgical site. The operator physically contacts the cutting tool 30 and/or the manipulator 20 to cause movement of the cutting tool 30.

The robotic manipulator 20 may include a force/torque sensor S configured to measure the forces and torques applied to the cutting tool 30 and/or the manipulator 20 by the operator. In one implementation, as shown in FIG. 1, the force/torque sensor S is located between the cutting tool 30 and the distal end 28 of the manipulator 20. The force/torque sensor S may be configured to monitor forces and torques placed on the cutting tool 30 by the operator during the manual mode in many degrees of freedom. In one implementation, the force/torque sensor S monitors loads applied to the cutting tool 30 in six-degrees of freedom (6DOF). Those skilled in the art appreciate that the force/torque sensor S may monitor loads applied to the cutting tool 30 and/or manipulator 20 in any suitable number of DOFs up to 6DOFs. In some instances, the operator may be required to depress and hold a trigger or switch to enable any movement commands in the manual mode. In other instances, the operator may simply apply forces and torques to the tool 30 to enable any movement commands in the manual mode.

In response to the applied forces and torques, the force/torque sensor S may be configured to generate a corresponding input that may be used by the control system 32, 36. In response to the operator-applied forces and torques, the robotic manipulator 20 moves the cutting tool 30 in a manner that emulates the movement that would have occurred based on the forces and torques applied by the operator. The robotic controller 32 processes the signals to determine control signals for determining a target position for the cutting tool 30 and/or a pose of the robotic manipulator 20. Based on the determination of arm target position, the robotic controller 32 selectively activates a motor of the robotic manipulator 20 in order to advance the manipulator 20 to the target position.

In the automated mode, the robotic controller 32 directs automated movement of robotic manipulator 20 and, in turn, the cutting tool 30 at the surgical site. In the automated mode, the robotic controller 32 is capable of automatically moving the cutting tool 30 free of operator assistance. Free of operator assistance may mean that an operator does not physically contact the cutting tool 30 to apply force to move the cutting tool 30. Instead, the operator may use some form of control to remotely manage starting and stopping of movement. For example, the operator may hold down a button of a remote control to start movement of the cutting tool 30 and release the button to stop movement of the cutting tool 30. Alternatively, the operator may press a button to start movement of the cutting tool 30 and press a button to stop movement of the cutting tool 30. In the automated mode, the robotic controller 32 directs automated movement of the cutting tool 30 along predefined tool paths and/or based on predefined movements or actions to perform the surgical procedure. The tool paths, movements, or actions that performed in the automated mode may be defined before and/or during the surgical procedure.

The manual mode and automated mode utilized for the techniques described herein can be like that described in U.S. Pat. No. 9,119,655, entitled "Surgical Manipulator Capable of Controlling a Surgical Instrument in Multiple Modes", the entire contents of which are hereby incorporated by reference. Examples of how the manual and automated modes are implemented with respect to controlling the cutting tool 30 will be described in detail below.

IV. Manual/Automated Surgical Actions for the Cutting Tool

During a surgical procedure involving resection of the anatomy, the control system 32, 36 may command a variety of actions with the cutting tool 30. For instance, the robotic cutting system 10 may (1) align the cutting tool 30 to one or more target planes 58, (2) resect the patient's anatomy along any target plane 58, (3) retract the cutting tool 30 along any target plane 58, and (4) change a pose (position and/or orientation) of the cutting tool 30 relative to the target plane 58. These primary techniques involved with resection will be referred to as "actions". These actions may be combined for any one or more steps of the procedure. For example, the tool 30 can be controlled to resect or retract along the target plane 58 by a changing of pose along the target plane 58. Furthermore, as will be understood below, any action described herein can include, or be defined to include, a plurality of sub-actions or sub-steps. For instance, a resection action can include an entry cut and a plunge cut along the same plane 58. Other actions of the cutting tool 30 besides those specifically listed herein are contemplated.

FIG. 3 illustrates an example action of the robotic cutting system 10 aligning the cutting tool 30 to target planes 58.

Figure 6:
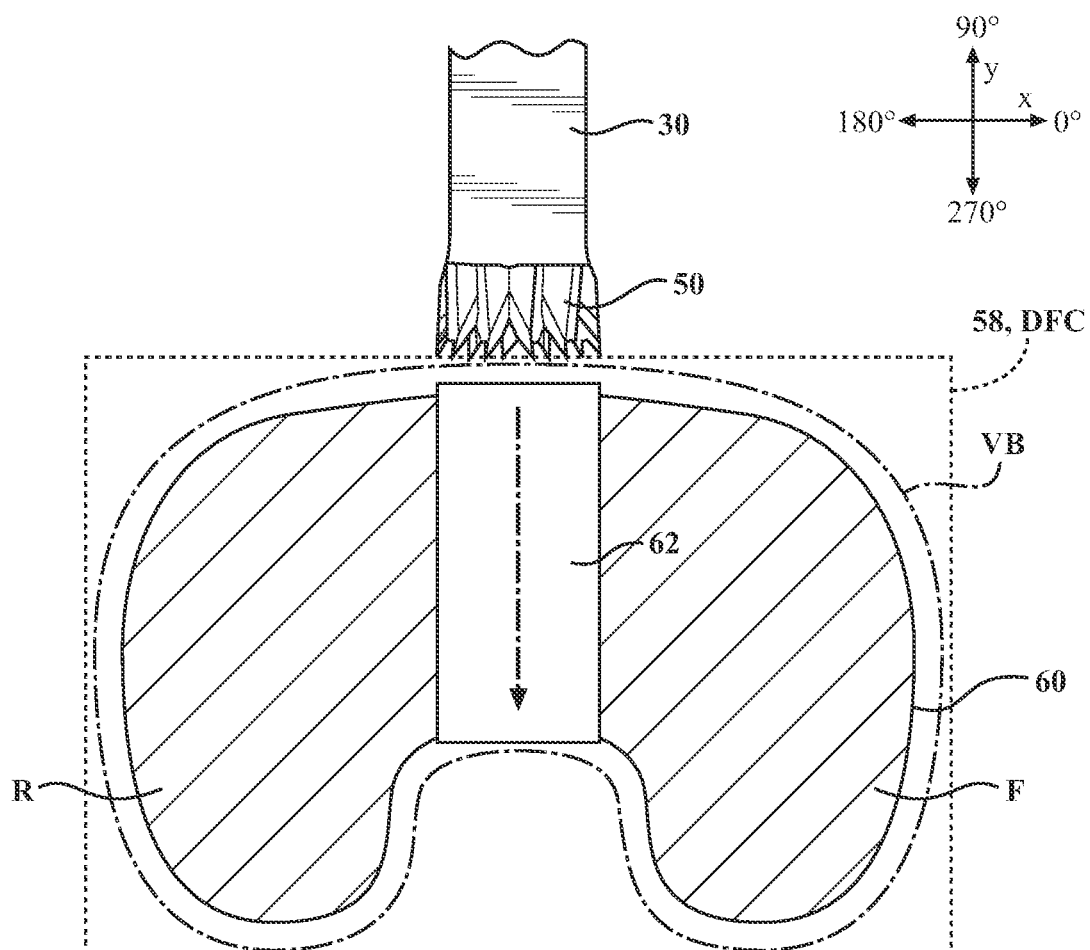
FIG. 6 illustrates the cutting tool shown relative to the femur, wherein the cutting tool is controlled to perform a cut along a predefined path, according to one implementation.
Figure 7:
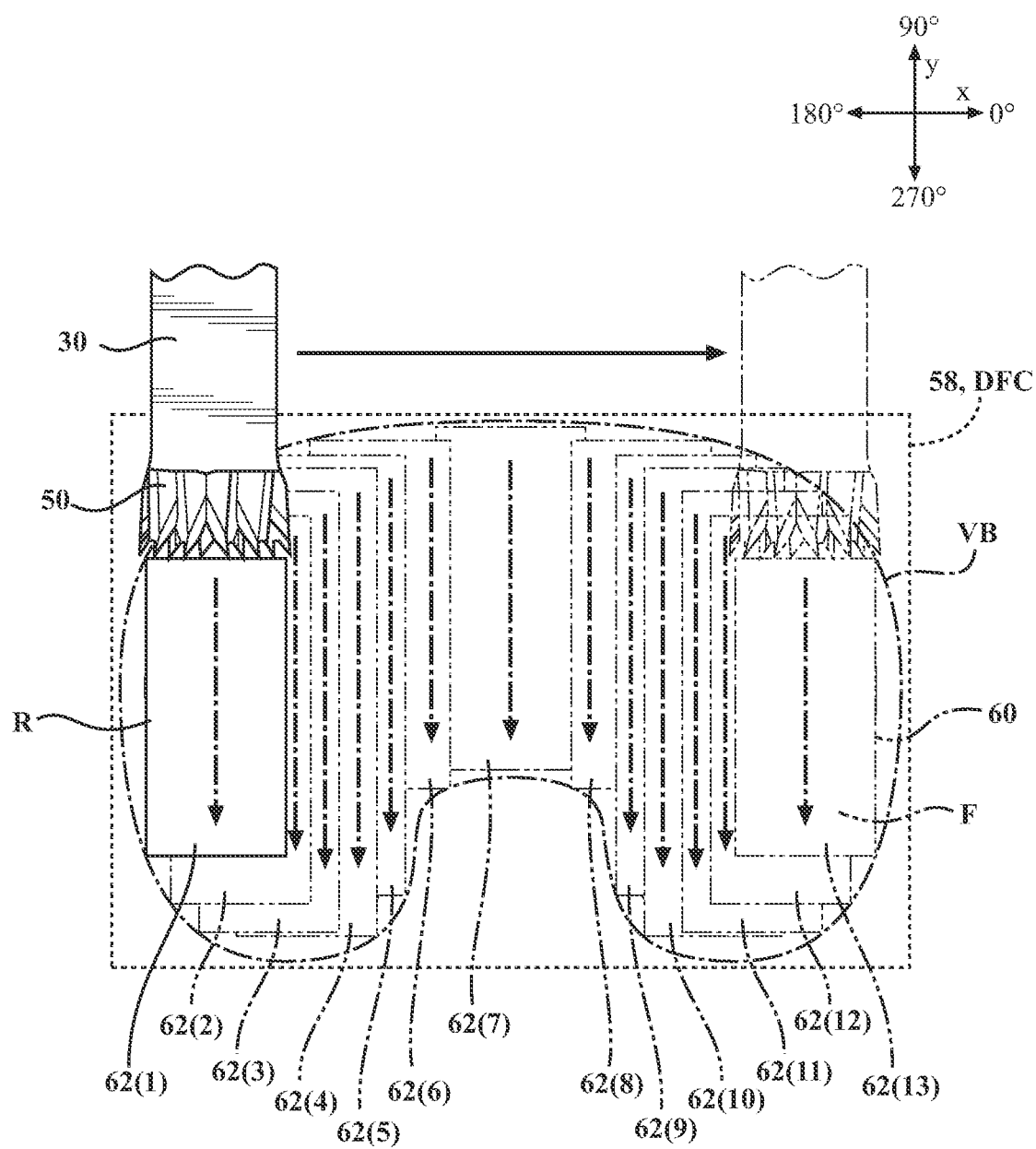
FIG. 7 illustrates the cutting tool shown relative to the femur, wherein the cutting tool is controlled to perform several cuts along several predefined paths by being positionally translated relative to the target plane, according to one implementation.
Figure 8:
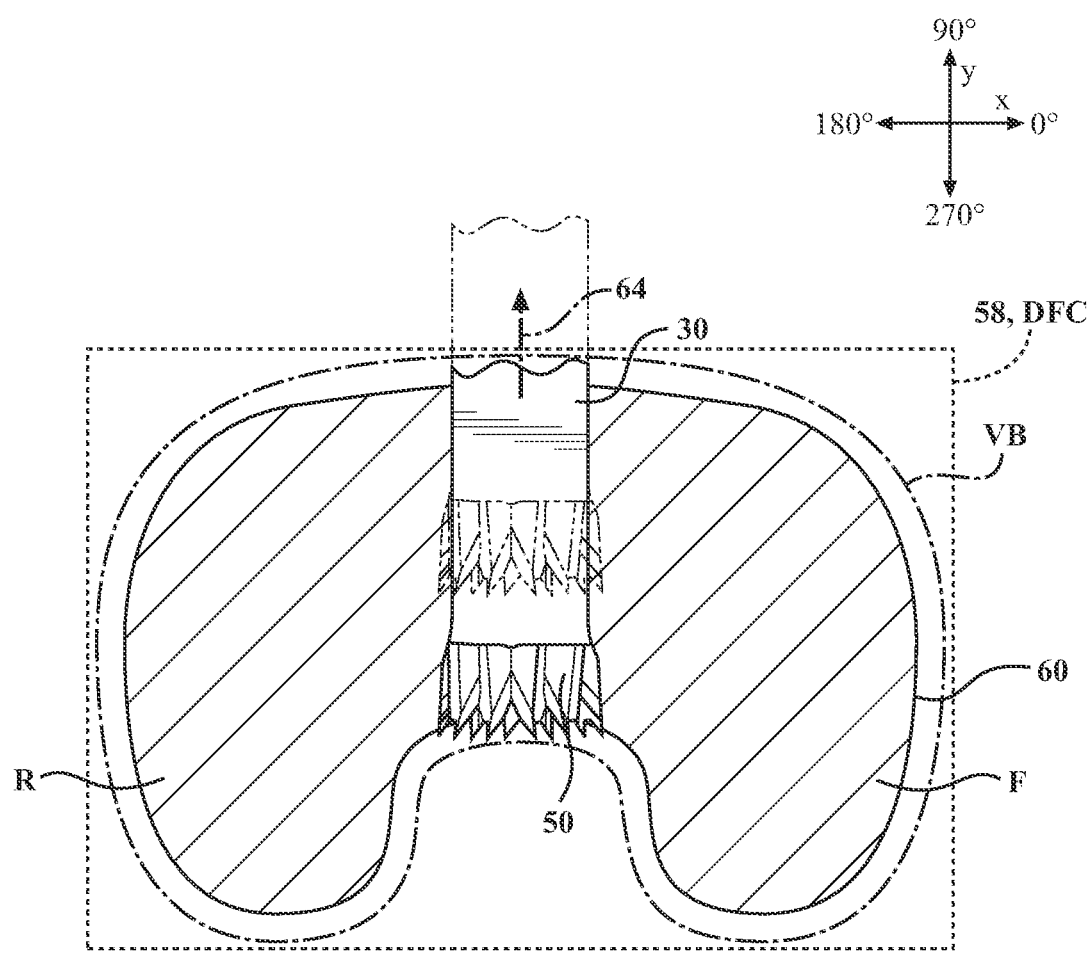
FIG. 8 illustrates the cutting tool shown relative to the femur, wherein the cutting tool is controlled to be retracted along the target plane, according to one implementation.
Figure 9:
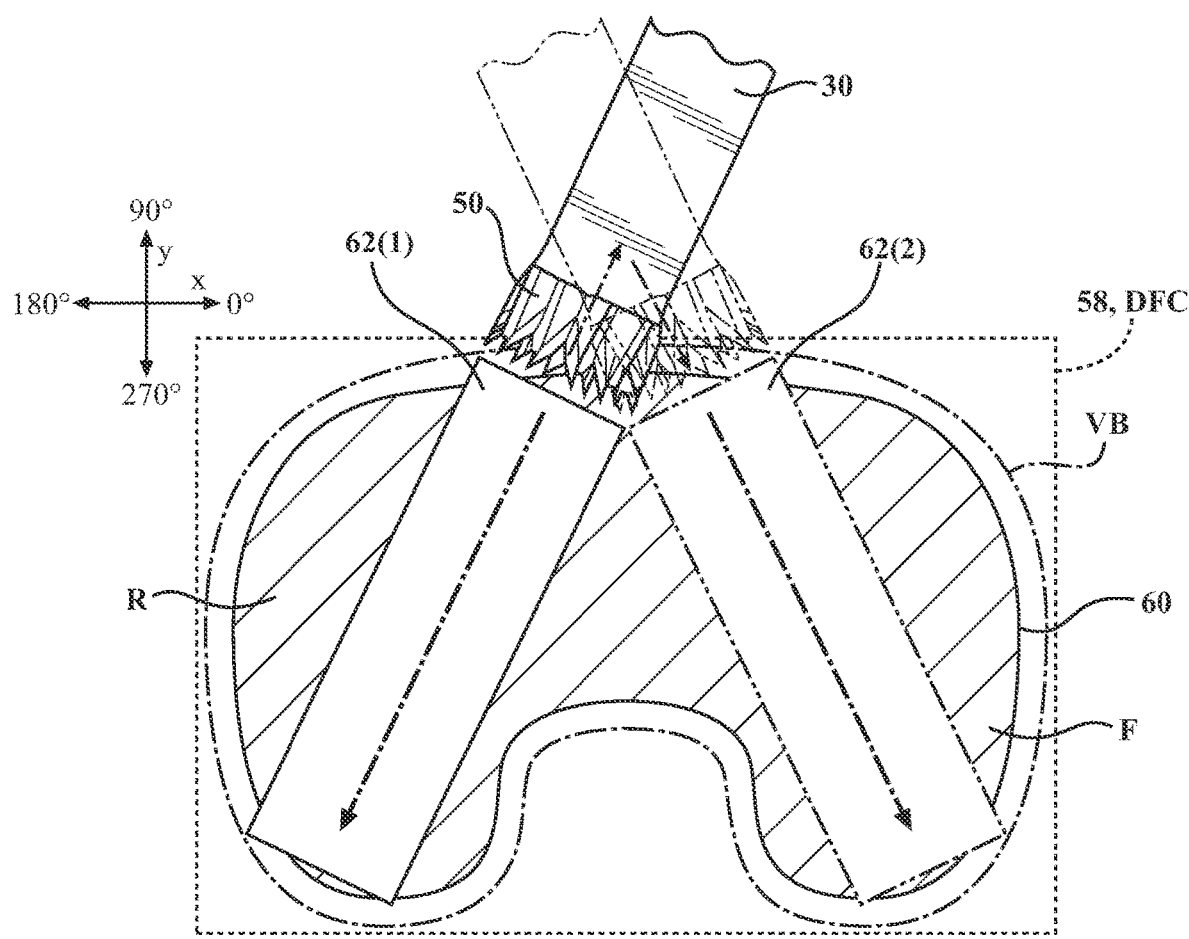
FIG. 9 illustrates the cutting tool shown relative to the femur, wherein the cutting tool is controlled to change pose relative to the target plane after performing a first cut, and in preparation for performing a second cut, according to one example.
Figure 10:
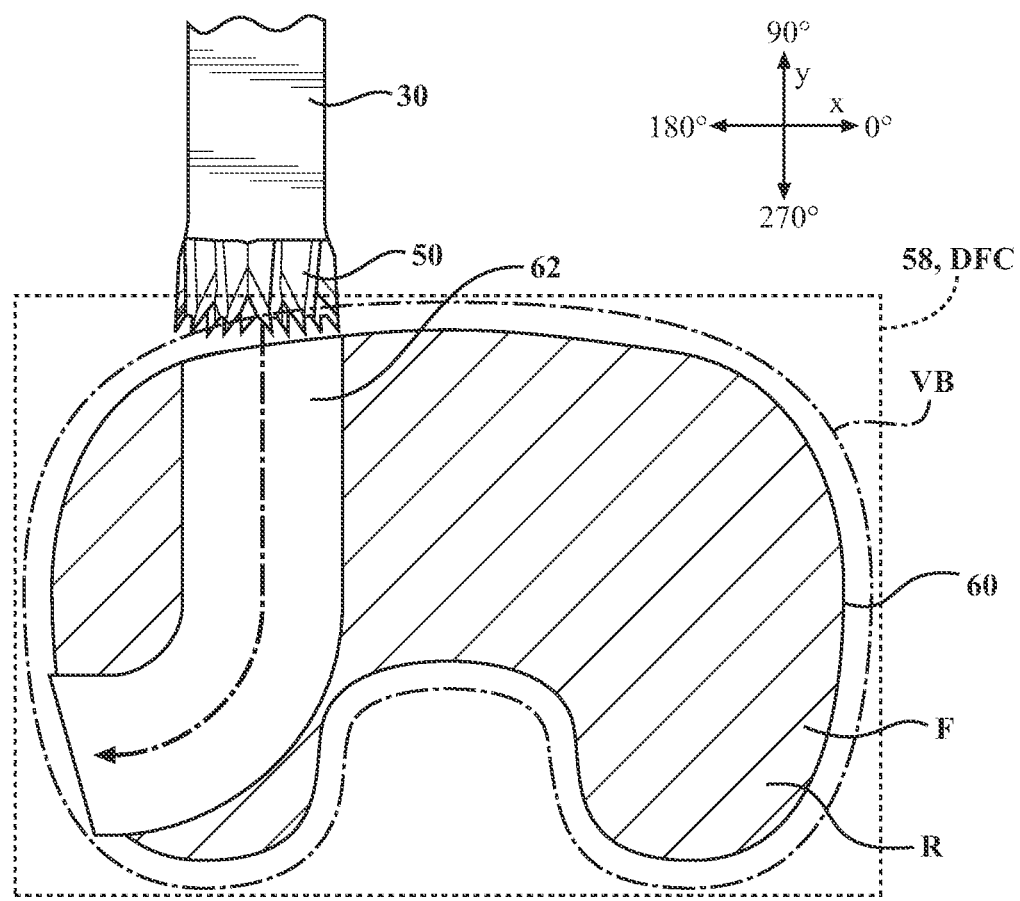
FIG. 10 illustrates the cutting tool shown relative to the femur, wherein the cutting tool is controlled to change pose relative to the target plane while performing first cut such that the path of the tool is curvilinear, according to one example.

FIGS. 6 and 7 illustrate an example of the robotic cutting system 10 resecting the patient's anatomy along the target plane 58 with the cutting tool 30. FIG. 8 illustrates an example of the robotic cutting system 10 retracting the cutting tool 30 along the target plane 58. FIGS. 9 and 10 illustrate an example of the robotic cutting system 10 changing a pose of the cutting tool 30 relative to the target plane 58.

Each individual action for the cutting tool 30 may occur in the manual mode or the automated mode. For example, referring to FIG. 5, a table is illustrated showing various combinations of manual mode and automated mode for each action. In the "action/mode combination" example 3 of the table, for example, alignment of the cutting tool 30 to the target plane 58 may be done manually in the manual mode, resection along the target plane 58 may be done automatically in the automatic mode, retraction of the cutting tool 30 along the target plane 58 may be done automatically in the automatic mode, and changing a pose of the cutting tool 30 on the target plane 58 may be done automatically in the automatic mode. Any of the examples and combinations of actions and modes in the table of FIG. 5 have been contemplated and can be implemented by the surgical system to perform automated or combination auto/manual resection of the anatomy with the cutting tool 30.

Furthermore, the control system 32, 36 may enable pre-operative or intraoperative selections or determinations about which actions should be performed in the manual mode and which actions should be performed in the automated mode (before such actions are performed). The action/mode combination selections can be made for sub-steps of any given action. The selections can be made by an operator or can be determined by the control system 32, 36. For example, the control system 32, 36 may automatically determine the action/mode combination selections based on the current surgical plan, historical surgical plan data, statistical patient data, and/or historical robotic data. In some cases, a machine learning algorithm or trained neural network can be utilized to adaptively learn which action/mode combinations to select. For instance, the control system 32, 36 may infer from these various data sources that surgeons prefer that alignment to the target plane and tool reorientations relative to the target plane are performed automatically, while resection and retraction actions are performed in the manual mode. Thereafter, the control system 32, 36 can output a surgical plan or cut plan that includes the predefined action/mode selections or suggestions. The predefined action/mode selections or suggestions by the control system 32, 36 may be overridden by the operator pre-operatively or intra-operatively, as desired.

Figure 11:
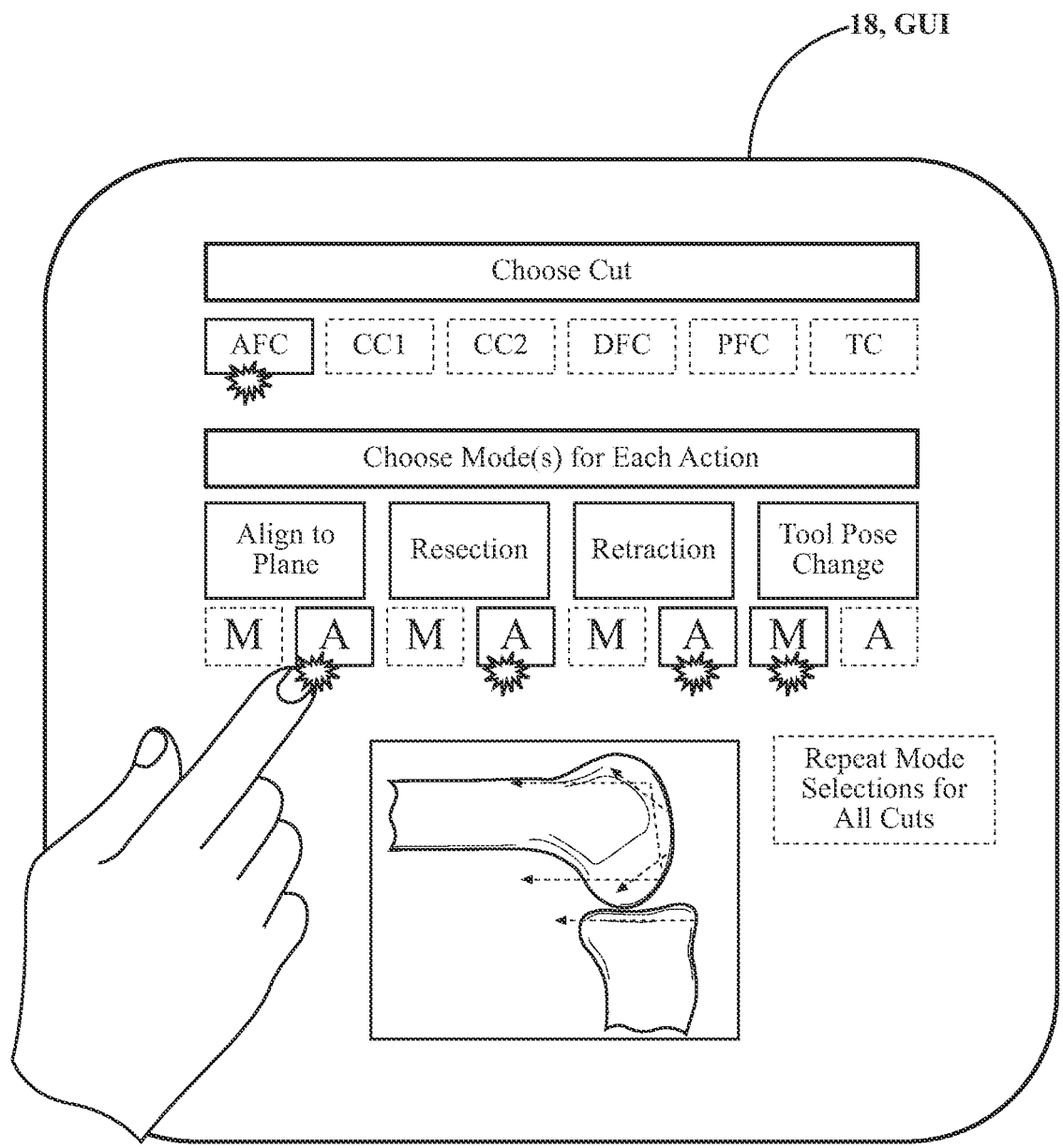
FIG. 11 is a graphic representation of a display screen that the operator interacts with to select action/mode combinations for a surgical procedure, or steps of the procedure, according to one implementation.

In some cases, the data of the table of FIG. 5 can be refined and displayed in a GUI, accessible on the display 18, such as shown in FIG. 11, to enable the operator to choose a predefined action/mode combination. As described above, the display 18 can be a head-mounted extended reality device, or any other type of monitor accessible to the user. With a head-mounted device, any of the selections described herein can be made using gesture control detection, gaze detection, verbal commands, or the like. The operator can make the action/mode combination selection for any one or more respective cuts or the action/mode combination can be the same for all cuts. In FIG. 11, the six cuts for the femur and tibia are shown. The operator selects one cut, e.g., AFC anterior femur cut. For this specific cut, the operator then chooses the mode by which each action should be performed, e.g., (M—in the manual mode, A—in the automated mode). As shown in the example, the operator selected that all actions for the AFC cut should be performed in the automated mode except for changing the pose of the tool, which should be performed in the manual mode. Other selections that can be made include mode selections for sub-steps for any given action. For instance, the resection action may include sub-steps for performing a series of cuts to reduce tool skiving. The operator can select the mode for each individual sub-step of the action. Additionally, a default feed rate of the tool may be displayed to the operator on the GUI for any of the actions. The operator can utilize the GUI to either confirm usage of the default feed rate or change the feed rate as desired.

This implementation provides the operator with flexibility to selectively and precisely manage the extent to which procedure should be automated or manually executed. Each surgeon may have individual preferences regarding whether to use the manual or automated mode for the various steps or actions of the procedure. Accordingly, by providing the robotic system with this versatile form of control, the system is well-suited to address the respective needs of each surgeon. In turn, the surgical workflow involved with making the several cuts of the TKA procedure can be made less intensive and less laborious on the surgeon and operating staff. Furthermore, by enabling the selective automation of certain actions, as needed, to perform the duration of the surgical procedure and the duration under which the patient is subject to anesthesia can be reduced. The robotic system therefore advantageously can provide a better surgical outcome as compared with conventional systems and techniques.

Once the selections are obtained and the procedure is about to begin, the manipulator 20 can be controlled to initiate the modes for the respective actions, as selected, in response to completion of each action. The completion of each action can be determined automatically or manually. For example, kinematic and/or localization data can be utilized to identify or infer robotic behavior, such as changing the alignment to another target plane 58. The relationship between the tool 30 and the anatomy can be logged in memory and compared to determine whether certain actions have been completed, such as a retraction or resection cut. Alternatively, the operator may utilize the display screen 18, or any other user input to inform the control system 32, 36 that the specific action has been performed. The display screen 18 or any other user interface may request confirmation from the operator before beginning the next step or next cut.

The selective action/mode assignment can be performed intraoperatively (as described above) or preoperatively. When performed preoperatively, the action/mode assignment can be determined based on surgeon preferences or based on a surgical plan. In some cases, historical or statistical procedure data may be analyzed to determine the action/mode assignment. For instance, the data may be based on robotic data from prior procedures. The data may collectively indicate the duration of each action, accuracy parameters of each action, criticality of each action, error events for each action, and the like. From this data, the surgical plan can be populated to assign the manual mode or automated mode for each action.

The operator may also override any manual mode action with an automated mode action, or vice-versa, using the GUI. Additionally, or alternatively, if the tool 30 is being operated in the automated mode for a certain action, the operator may exert a force/torque and/or depress the trigger on the cutting tool 30 to override automated control with manual mode control. Similarly, if the tool 30 is being operated in the manual mode for a certain action, the operator may temporarily pause and utilize the user interface or GUI to override manual control with automated mode control.

The operator may use some form of control to remotely manage starting and stopping of an action in the automatic mode. For instance, the control may be configured to automatically control the action individually. In one such instance, the control may include physical buttons on the cutting tool 30 or hand-held control pendant, or digital buttons displayed on the GUI, for initiating each action separately in the automated mode. In this way, an operator of the robotic cutting system 10 may perform one or more of the actions in the manual mode and thereafter can easily transition to performing one or more actions in the automatic mode. Manual and automatic modes of each action will be described in greater detail below.

Accordingly, the techniques described herein enable selective automated and manual mode control for performing resection surgery. The operator is empowered to define which actions will be manually controlled to provide the operator with a greater sense of control for that specific action. Meanwhile, the operator can specify automated mode control for other actions, for instance, which may be more complex or may add time to the surgical workflow. The benefits are intensified by the ability of the operator to make such choices for each given cut of the procedure. For instance, all actions for the tibial cut may be chosen to be fully automated while the actions for the femur cuts may be chosen to have only certain actions automated. Therefore, the robotic system 10 implements a technique that is more dynamic than traditional manually controlled systems while providing the operator selective control over the degree to which the surgery will be automated.

A. Action: Aligning the Cutting Tool to the Target Plane

FIG. 3 illustrates an instance where the cutting tool 30 is aligned to a target plane 58 by the robotic manipulator 20 (in the manual mode or the automated mode). As shown, the cutting tool 30 is aligned to a first target plane 58' such that movement of the cutting tool 30 along the first target plane 58' performs a chamfer cut CC1.

Additionally, the cutting tool 30 may be aligned to multiple target planes 58 during a surgical procedure. For example, referring to FIG. 3, the cutting tool 30 may first be aligned to the first target plane 58' such that movement of the cutting tool 30 along the first target plane 58' performs a chamfer cut CC1. The cutting tool 30 may then be aligned to a second target plane 58" such that movement of the cutting tool 30 along the second target plane 58" performs a distal femur cut DFC.

In other instances, the cutting tool 30 may be aligned to any suitable number of target planes 58 during a surgical procedure and in any suitable order. For example, the cutting tool 30 may be aligned to a target plane 58 to perform an anterior femur cut AFC, then to a target plane 58 to perform a chamfer cut CC1, then to a target plane 58 to perform a distal femur cut DFC, then to a target plane 58 to perform a chamfer cut CC2, then to a target plane 58 to perform a posterior femur cut PFC, and finally to a target plane 58 to perform a tibial cut.

The cutting tool 30 may be aligned to a target plane 58 in the manual mode. In such instances, an operator may apply forces/torques to the cutting tool 30 to move the cutting tool 30 to align the cutting tool 30 with a target plane 58. Furthermore, in the manual mode, the control system 32, 36 may act to guide alignment of the cutting tool 30. For example, the robotic controller 32 may allow movement of the cutting tool 30 if the forces and torques placed on the cutting tool 30 by the operator would move the cutting tool 30 toward a target plane 58. Similarly, the control system 32, 36 may prevent movement of the cutting tool 30 if the forces and torques placed on the cutting tool 30 by the operator would move the cutting tool 30 away from a target plane 58.

In the manual mode, attractive haptics may be utilized to help guide the operator to moving to the target plane 58. In some cases, the control system 32, 36 can detect the direction of force/torque manually applied to the tool 30 by the operator in the manual mode and determine whether the direction of force/torque is towards the target plane 58 or intersecting the target plane 58. If so, the manipulator 20 can be controlled to move the tool 30 to the target plane 58. In some instances, this movement is implemented using attractive haptics. Such attraction can be implemented by guide handler of the control system 32, 36 obtaining a current state of the tool 30 (away from the target plane) and a target state for the tool 30 (aligned with the target plane) and generating one or more virtual constraints based on the current and target states. The control system 32, 36 can implement a constraint force adapted to attract the tool 30 toward the target state aligned with the target plane from the current state based virtual constraints. The control system 32, 36 can implement a virtual simulator to simulate dynamics of the tool 30 in a virtual simulation based on input from the force/torque sensor S and based on the constraint force to output a commanded pose. The control system 32, 36 then commands the manipulator 20 to move the tool 30 to align with the target plane 58 based on the commanded pose to thereby provide haptic feedback to the operator that guides the operator toward placing the tool 30 at the target state. Examples of attractive haptics which can be utilized to guide the tool to the target plane can be like that described in U.S. patent application Ser. No. 17/701,989, entitled "Systems And Methods For Guiding Movement Of A Tool", the entire contents of which are incorporated by reference herein.

The cutting tool 30 may be aligned to a target plane 58 in the automated mode. In such instances, the control system 32, 36 may identify a pose of a target plane 58 and automatically move the cutting tool 30 such that the pose of the cutting tool 30 is aligned with the target plane 58. In one example, the control system 32, 36 may determine a predefined tool path 62 along which the cutting tool 30 follows wherein the tool path 62 is designed to align the cutting tool 30 along one or more target planes 58. Once the control system 32, 36 determines the predefined tool path 62, the control system 32, 36 may automatically advance the tool 30 along the path to align the cutting tool 30 to one or more target planes 58 during the surgical procedure. The tool 30 can be advanced to align to the target plane 58 according to a default feed rate that is predefined by the system. The operator may be able to modify the default feed rate before the alignment action occurs or change the feed rate during the alignment action.

The manual mode may be utilized for aligning the tool 30 to certain target plane(s) 58 while the automated mode may be utilized for aligning the tool 30 other target plane(s) 58. In some instances, the action of aligning the tool 30 to the target planes 58 may be performed exclusively in either the manual mode or automated mode. In other instances, the action of aligning the tool 30 to the target plane 58 may include a combination of sub-actions or sub-steps, where some steps can be selected to be performed in the manual mode while other steps are selected to be performed in the automated mode. For instance, for one step of the alignment action, the operator may guide the tool 30 to a remote location from the anatomy in the manual mode, and thereafter for a second step, an automated mode tool path may be generated to advance the tool from the remote location to an aligned pose relative to the target plane 58. In another example, for one step of the alignment action, an automated mode tool path may be generated to advance the tool from a remote location to an aligned pose relative to the target plane 58 and at an end location that is spaced apart from the bone by a predefined distance. Thereafter, for the second step, the operator may guide the tool 30 from the end location towards the anatomy in the manual mode.

B. Action: Resecting Along the Cutting Plane

Another action of the cutting tool 30 that can be performed by the manipulator 20 involves performing a resection with the cutting tool 30. FIGS. 6 and 7 illustrate instances where the control system 32, 36 controls the cutting tool 30 to resect a patient's anatomy, which is shown as a femur F. In the instances shown in FIGS. 6 and 7, the cutting tool 30 resects the patient's anatomy by moving along a path 62, as determined or commanded by the control system 32, 36. In this specific example, movement of the cutting tool 30 along the path 62 resects the femur F and performs a distal femur cut DFC. Of course, the other cuts can be performed using the techniques described herein. Furthermore, the action of performing a resection may, but does not necessarily, require removing all material from the target plane 58. In other words, the resection action may include a partial resection performed by one or more cuts by the cutting tool 30. Thus, it is contemplated that the resection action can include one or more steps, or series of actions.

To perform the resection action in the automated mode, the cutting tool 30 is activated such that the cutting tool 30 can remove tissue and the cutting tool 30 moves along a predefined path 62. As shown in FIG. 6, the predefined path 62 can be a longitudinal path (y-direction, 270 degrees) along the target plane 58 extending along the cross-sectional portion of the bone. Of course, the predefined path 62 can be oriented differently than in the y-direction shown. For example, the predefined path 62 can include various turns, pivot points for the cutting tool 30, and changes of direction (e.g., x-y direction).

The resection action in the automated mode can be implemented by moving the cutting tool 30 in a straight line, a curved path, or a curvilinear path (changing the pose of the tool during resection). Thus, a plunge cut is not necessarily required to be in a straight line. When curved path or curvilinear is used, however, the control system may determine a pre-cut based on the geometry and direction of the curve to remove material to enable space for the cutting tool 30 to reorient to the curve. Once the pre-cut is performed, the cutting tool 30 is commanded along the predefined curved path 62.

In the automated mode, the cutting tool 30 may move along more than one predefined path 62 to fully resect the patient's anatomy. For example, as shown in FIG. 7, the cutting tool 30 may move along a series of predefined paths 62(1)-62(13) to resect the femur F along the target plane 58 and to fully perform a distal femur cut DFC. The predefined path 62 may cause the tool 30 to interact with the bone by performing a series of plunge cuts wherein the tool 30 faces the bone, makes a resection cut, retracts from the cut, then changes pose to make another cut, and so on. Hence, the predefined path 62 can define the path of movement for the tool 30 in a way that implicates several of the actions described herein. For instance, the predefined path 62 can define a series of actions within the same target plane 58, including several resection cuts, retractions and pose changes for the tool 30.

The control system 32, 36 may determine the predefined path 62 using any suitable method. For example, the control system 32, 36 may preoperatively and/or intraoperatively determine the predefined path 62 based on the target plane 58, the target perimeter 60, and/or the virtual boundary VB. More specifically, the control system 32, 36 may determine the predefined path 62 such that movement of the cutting tool 30 along the predefined path 62 resects the entirety of portion R of the patient's anatomy within the target perimeter 60 while respecting the virtual boundary VB. In some instances, the predefined path 62 can include more than one pass. For instance, the predefined path 62 can include a first pass for bulk cutting the anatomy and perform a finishing pass for removing any leftover portions of region R that were not cut during the first pass. A removed material logger can be implemented by the control system 32, 36 to monitor, over time, the pose of the tool 30 relative to the registered bone model to determine what material may be left over after the first pass. In other words, the control system 32, 36 identifies the volume of bone to be cut and tracks the volume of bone remaining to be cut. Once the remaining bone portion(s) is/are identified, one or more predefined paths 62 can be generated to enable the cutting tool 30 to remove the portion(s). The removed material logger can be like that described in U.S. Pat. No. 9,119,655, entitled "Surgical Manipulator Capable of Controlling a Surgical Instrument in Multiple Modes", the entire contents of which are hereby incorporated by reference.

The control system 32, 36 may also determine the predefined path 62 to optimize a cutting efficiency of the cutting tool 30. For example, the control system 32, 36 may determine the predefined path 62 based on a density of the patient's anatomy, a type or size of the cutting tool, and/or a shape of the patient's anatomy.

The control system 32, 36 can define a feed rate for the predefined path 62, which is the velocity at which the tool 30 is moved along the predefined path 62. The feed rate can be predefined based on a surgical plan or can set by the operator before or during the cut. In some instances, the operator can control the feed rate during automated movement, e.g., using a remote control or pendant like that described in U.S. Pat. No. 9,119,655, entitled "Surgical Manipulator Capable of Controlling a Surgical Instrument in Multiple Modes", the entire contents of which are hereby incorporated by reference. The feed rate for resection cuts can be defined differently from the feed rate for retraction actions along the predefined path 62. For instance, the feed rate for cutting can be made slower to avoid skiving or ensure a smooth cut. After the cut, a faster feed rate can be utilized to retract the tool 30 along the predefined path 62 to expedite the process of getting to the next cut on the same target plane 58. The operator can select the feed rate pre-operatively or intraoperatively. In some cases, the GUI can be utilized to enable the operator to manage the feed rate for the resection action, or each sub-step of the resection action. In some instances, the system may provide a default feed rate and the operator can modify the default feed rate, as desired.

In the manual mode, the control system 32, 36 may move the cutting tool 30 to resect the patient's anatomy based on forces and torques placed on the cutting tool 30 by the operator, as sensed by the force/torque sensor S. In response, the control system 32, 36 may move the cutting tool 30 in a manner that emulates the forces and torques placed on the cutting tool 30 by the operator to resect the patient's anatomy. Thus, although the tool 30 may move along a path, the path is dictated by the operator and is not predefined as it would be in the automated mode.

In the manual mode, the control system 32, 36 may prevent movement of the cutting tool 30 and/or cease actuation of the cutting tool 30 based on interaction with the virtual boundary VB. For example, in the manual mode, the virtual boundary VB may define the limits beyond which the cutting tool 30 should not move or resect. In the event the practitioner wants to position the cutting tool 30 beyond the virtual boundary VB during resection, the control system 32, 36 prevents movement of the cutting tool 30 and/or ceases actuation of the cutting tool 30.

In the manual mode, the control system 32, 36 also constrains movement of the cutting tool 30 to the target plane 58 when the cutting tool 30 is located within the target plane 58. Thus, the control system 32, 36 will provide a haptic response and limit the operator's ability to move the tool 30 if the forces and torques placed on the cutting tool 30 by the operator would otherwise cause the cutting tool 30 to collide with the target plane 58.

The manual mode may be utilized for performing a resection cut with the tool 30 for certain target plane(s) 58 while the automated mode may be utilized for performing a resection cut with the tool 30 for other target plane(s) 58. In some instances, the action of performing a resection cut with the tool 30 may be performed exclusively in either the manual mode or automated mode.

Also, it is possible that for a single target plane 58, a combination of manual and automated mode may be utilized for a resection action. For instance, the action/mode combination can be chosen such that the first "bulk cutting" pass is performed in the manual mode while the second "finishing cut" pass is performed in the manual mode. In another example, the resection action can comprise two sub-actions to reduce the possibility of tool skiving: (1) performing an initial cut between the cutting tool 30 and the outer (cortical) surface of the bone at an entry location relative to the target plane 58, and (2) after the initial cut, performing a plunge cut resection along the target plane 58 from the entry location. In this example, the action/mode combination can be chosen such that the initial cut is performed in the automated mode and the plunge cut is performed in either the manual or automated mode. The feed rate for the initial cut in the automated mode can be defined differently from the feed rate for performing the subsequent plunge cut. For instance, the feed rate for the initial cut in the automated mode can be made slower to avoid skiving at the entry location. Thereafter, a faster feed rate can be utilized to enable the cutting tool 30 (in either the manual or automated mode) to perform the subsequent plunge cut to expedite tissue removal. By controlling the initial cut in this manner, the possibility of skiving of the tool can reduced, which can be particularly advantageous when the system is performing the automated resection without direct operator control.

The system may be configured to detect transitions between cortical bone and cancellous bone for purposes such as skiving mitigation. In one example, sensors can be coupled to the manipulator and/or the cutting tool 30 to facilitate detection transitions between cortical bone and cancellous bone. The sensor can be a force/torque sensor, a pressure sensor, tissue temperature sensor, electrical current or power drawn by the cutting tool 30, or the like. Additionally, or alternatively, the navigation system can include patient imaging data (registered to the patient) which identifies cancellous/cortical bone transitions. The patient imaging data can include bone density information, such as BMD data. The navigation system can compare the location of the cutting tool 30 to the bone transitions. In any of these examples, when a transition is detected, the mode and/or feed rate can be changed automatically.

For use in either the manual or automated mode, the surgical system can employ sensors on the cutting tool 30 or sensors (such as the force/torque sensor S) or joint motor sensors to detect off-axis load applied to the tool 30. The off-axis load may indicate an undesirable condition, such as deflection or skiving the cutting tool 30. This condition is most likely to occur during resection actions when the tool 30 engages a bone region. The control system 32, 36 can measure this off-axis load relative to a threshold time, magnitude and/or direction. If the control system 32, 36 determines that the threshold has been exceeded, a mitigating action can be commanded to the manipulator 20 and/or cutting tool 30 to alleviate the condition. In one implementation, the mitigating action is to adjust the feed rate or entry speed the cutting tool 30. For example, the feed rate may be slowed to reduce the possibility of skiving. In another instance, an adjustment can be made to the volume of the bone to be cut for each pass by modifying the tool path(s). If the tool path passes are closer together, the cutting tool 30 will be exposed to less bone during cutting which can decrease the likelihood that skiving will occur.

C. Action: Retracting the Cutting Tool Along the Target Plane

Another action of the cutting tool 30 that can be performed by the manipulator 20 involves retracting the cutting tool 30. Retracting the cutting tool 30 means to withdraw, pull back, draw back, or change the direction of the cutting tool 30 to move away from a tissue resection region. Retraction may involve the cutting tool 30 exiting the bone region or may involve the cutting tool 30 remaining in the bone region. For example, a retraction action may occur after any resection action to pull back the cutting tool 30 to perform the next iteration of cutting. In such instances, the retraction may occur after performing a resection cut in either the manual or automated modes. In another example, retraction may occur in response to a collision with a virtual boundary VB or exceeding the target perimeter 60. The retraction action may occur while the cutting tool 30 is constrained relative to the target plane 58. However, there may be instances when retraction occurs while the cutting tool 30 exits the constraints of the target plane 58. For example, the retraction may cause the cutting tool 30 to exit the target plane 58 in preparation for alignment to another target plane 58.

FIG. 8 illustrate an example of the cutting tool 30 being controlled to retract along the target plane 58. The cutting tool 30 is retracted by moving along a retraction path, as indicated by the arrow at 64. The direction of retraction can be different from what is shown. The cutting tool 30 can retract from any given pose (position and/or orientation) in the target plane 58.

In the automated mode, the control system 32, 36 may be configured to automatically retract the cutting tool 30 along predefined retraction path(s). The control system 32, 36 may determine the predefined retraction path using any suitable method. For example, the control system 32, 36 may limit or define the predefined retraction path in any of the one or more of the following ways: to retract along the target plane 58; to avoid collisions or potential collisions between any portion of the cutting tool 30 and any other object (e.g., virtual boundary VB or anatomy); to retract the cutting tool 30 to be within the target perimeter 60; to retract the cutting tool 30 away from its last deepest cut point; to retract the cutting tool 30 by a predetermined retraction distance, e.g., 100 mm; to retract the cutting tool 30 to exit the region of the anatomy (e.g., in preparation for the alignment to another target plane); to retract the cutting tool 30 in a straight line, a curved path, or a curvilinear path (changing the pose of the tool during retraction); to retract the cutting tool 30 in a straight line, a curved path, or a curvilinear path; to retract the cutting tool 30 to the starting point of a subsequent cutting path; and the like.

The control system 32, 36 can define a feed rate for the retraction path 64, which is the velocity at which the cutting tool 30 is retracted along the path 64. The feed rate can be predefined based on a surgical plan or can set by the operator before or during the retraction. In some instances, the operator can control the feed rate during automated movement, e.g., using a remote control or pendant like that described in U.S. Pat. No. 9,119,655, entitled "Surgical Manipulator Capable of Controlling a Surgical Instrument in Multiple Modes", the entire contents of which are hereby incorporated by reference. The feed rate for retraction can be defined differently from the feed rate for resection cut actions along the tool path 62. For instance, the feed rate for retraction can be made faster to expedite the process of getting to the next cut on the same target plane 58. The operator can select the feed rate for the retraction action pre-operatively or intraoperatively. In some cases, the GUI can be utilized to enable the operator to manage the feed rate for the retraction action, or each sub-step of the retraction action. In some instances, the system may provide a default feed rate and the operator can modify the default feed rate, as desired.

During retraction in the automated mode, the cutting tool 30 may be activated or deactivated. The control system 32, 36 may enable the surgeon to configure a setting to activate or deactivate the cutting tool 30 during retractions. Alternatively, this may be a default setting from the surgical plan.

In the manual mode, the control system 32, 36 may retract the cutting tool 30 based on forces and torques placed on the cutting tool 30 by the operator, as sensed by the force/torque sensor S. In response, the control system 32, 36 may retract the cutting tool 30 in a manner that emulates the forces and torques placed on the cutting tool 30 by the operator to retract the patient's anatomy.

In the manual mode, the control system 32, 36 may prevent movement of the cutting tool 30 based on interaction with the virtual boundary VB. For example, in the manual mode, the virtual boundary VB may define the limits beyond which the cutting tool 30 should not move or be retracted. In the event the practitioner wants to retract the cutting tool 30 beyond the virtual boundary VB, the control system 32, 36 prevents movement of the cutting tool 30.

In the manual mode, the control system 32, 36 also constrains movement of the cutting tool 30 to the target plane 58 when the cutting tool 30 is located within the target plane 58. Thus, the control system 32, 36 will provide a haptic response and limit the operator's ability to move the tool 30 if the forces and torques placed on the cutting tool 30 by the operator would otherwise cause the cutting tool 30 to collide with the target plane 58. However, assuming no collision with the target plane 58, the control system 32, 36 enables retraction movement of the cutting tool 30 to allow the operator to manually pull back the tool 30 relative to the target plane 58.

In the manual mode, it may be useful to limit how the operator retracts the tool 30. For example, the input from the force/torque sensor S can be utilized by the control system 32, 36 to compare the direction of the resection to the direction of the subsequent retraction. If the directions oppose one another within a threshold, the control system 32, 36 may enable the manual retraction. If on the other hand, the direction of retraction differs in orientation from the direction of resection by a threshold, the control system 32, 36 may implement a virtual constraint on the tool 30 to limit the retraction direction to be opposite the resection direction.

The manual mode may be utilized for performing a retraction action with the tool 30 for certain target plane(s) 58 while the automated mode may be utilized for performing a retraction action with the tool 30 for other target plane(s) 58. In some instances, the retraction action of the tool 30 may be performed exclusively in either the manual mode or automated mode. Also, it is possible that for a single target plane 58, a combination of manual and automated mode may be utilized. For instance, the action/mode combination can be chosen such that the first "bulk cutting" pass is performed in the manual mode while the second "finishing cut" pass is performed in the manual mode. During bulk cutting, manual retractions will occur, and during finishing cuts, automated retractions will occur.

D. Action: Changing a Pose of the Cutting Tool Relative to Target Plane

Another action of the cutting tool 30 that can be performed by the manipulator 20 involves changing the pose of the cutting tool 30. To change a pose of the cutting tool 30, manipulator 20 alters an orientation and/or position of the cutting tool 30. The pose change action may occur while the cutting tool 30 is inside, outside, or partially within the bone region. For example, a pose change action may occur after any resection or retraction action to change the position/orientation of the cutting tool 30 to perform the next iteration of cutting. In such instances, the pose change action may occur after performing a resection or retraction action in either the manual or automated modes. In another example, the pose change action may occur in response to a collision with a virtual boundary VB or exceeding the target perimeter 60. The pose change action may occur while the cutting tool 30 is constrained relative to the target plane 58. However, there may be instances when pose change action occurs while the cutting tool 30 exits the constraints of the target plane 58. For example, the pose change action may occur outside of the target plane 58 in preparation for alignment to another target plane 58.

FIGS. 7, 9 and 10 illustrate different examples of changing the pose of the cutting tool 30. Referring to FIG. 7, the control system 32, 36 commands the manipulator 20 to alter the position of the cutting tool 30 by translating the tool 30 in the x-direction, while maintaining the orientation of the tool 30 in the y-direction. This change of position can be performed for many reasons, such as to prepare the tool 30 to perform a series of linear cuts. In FIG. 9, the manipulator 20 is commanded to alter an orientation of the cutting tool 30 to prepare the cutting tool 30 for resection along the second predefined path 62(2) after controlling the cutting tool 30 to resect along the first predefined path 62(1). As shown, the orientation of the cutting tool 30 is changed from 250 degrees to 290 degrees relative to the xy-coordinate system of the target plane 58. In FIG. 10, the pose is changed by altering an orientation of the cutting tool 30 during resection along the predefined path 62. Here, the cutting tool 30 first follows a straight path 62 along the y-direction (270 degrees), and then is reoriented towards the x-direction (180 degrees) thereby forming a curvilinear resection path 62.

In the automated mode, the control system 32, 36 may be configured to automatically change the pose of the cutting tool 30 with an auto pose change action. The control system 32, 36 may determine the movement and/or timing of the auto pose change action based on various inputs or events, such as: to change pose to facilitate exiting the region of the anatomy (e.g., in preparation for the alignment to another target plane); to change pose before, during, or after retraction actions; to change pose before, during, or after resection actions; to change pose before, during, or after alignment to the target plane; to change pose within or outside of the target plane 58; to avoid collisions or potential collisions between the cutting tool 30 and any other object (e.g., virtual boundary VB or anatomy); to change pose so that the cutting tool 30 is maintained within the target perimeter 60; to change pose to follow a predefined cutting path; to change the position of the cutting tool 30 by a predetermined displacement, e.g., 100 mm; to change the orientation of the cutting tool 30 by a predetermined angle, e.g., 15 degrees; to change pose of the cutting tool 30 towards the starting point of a subsequent cutting path, etc.

The parameters of the auto pose change action may be based on a surgical plan, surgeon preferences, tool geometry, anatomy geometry, manipulator constraints, and the like. During an auto pose change action in the automated mode, the cutting tool 30 may be activated or deactivated. The control system 32, 36 may enable the surgeon to configure a setting to activate or deactivate the cutting tool 30 during pose changes. Alternatively, this may be a default setting from the surgical plan.

In the manual mode, the control system 32, 36 may change pose of the cutting tool 30 based on forces and torques placed on the cutting tool 30 by the operator, as sensed by the force/torque sensor S. In response, the control system 32, 36 may alter the pose of the cutting tool 30 in a manner that emulates the forces and torques placed on the cutting tool 30 by the operator when making the pose change.

In the manual mode, the control system 32, 36 may prevent pose changes of the cutting tool 30 based on interaction with the virtual boundary VB. For example, in the manual mode, the virtual boundary VB may define the limits beyond which the cutting tool 30 should not move or change pose. In the event the practitioner wants to change the pose of the cutting tool 30 beyond the virtual boundary VB, the control system 32, 36 prevents movement of the cutting tool 30.

In the manual mode, the control system 32, 36 also constrains movement of the cutting tool 30 to the target plane 58 when the cutting tool 30 is located within the target plane 58. Thus, the control system 32, 36 will provide a haptic response and limit the operator's ability to change the pose the tool 30 if the forces and torques placed on the cutting tool 30 by the operator would otherwise cause the cutting tool 30 to collide with the target plane 58.

The manual mode may be utilized for performing pose change actions with the tool 30 for certain target plane(s) 58 while the automated mode may be utilized for performing auto pose change actions with the tool 30 for other target plane(s) 58. In some instances, the pose change action of the tool 30 may be performed exclusively in either the manual mode or automated mode. Also, it is possible that for a single target plane 58, a combination of manual and automated mode may be utilized. For instance, the action/mode combination can be chosen such that the first "bulk cutting" pass is performed in the manual mode while the second "finishing cut" pass is performed in the manual mode. During bulk cutting, manual pose change actions will occur, and during finishing cuts, automated pose change actions will occur.

E. Context Aware Switching for Manual/Automated Surgical Actions

Any of the above-described manual/automated surgical actions can be automatically triggered in response to the control system 32, 36 detecting a pre-defined behavior, situational context, or completion of a step or steps. For instance, the control system 32, 36 can automatically switch between the resection action and the retraction action. The resection action may be identified by the control system 32, 36 as having been completed in response to various inputs. For example, the control system 32, 36 can sense activity related to pressing of the trigger for the tool 30, collision between the tool 30 and the virtual boundary VB, by monitoring the amount of material removed from the target plane 58 by the tool 30, or by monitoring the paths taken by the tool 30 relative to the surgical plan. Using any one or more of these inputs, the control system 32, 36 can infer that the resection action is completed and trigger an automatic switch to the retraction action. The retraction action can then be performed manually or automatically, depending on the settings. The switch by the control system 32, 36 can involve switching of the action, as well as automated switching of the mode, e.g., between manual and automated mode, or vice-versa. For instance, the resection action can be performed in the manual mode, and after the control system 32, 36 detects the predetermined behavior, the control system 32, 36 can switch to the automatic mode for performing the retraction and/or reorientation of the tool 30. In some cases, specific inputs may be required to change the action or mode. For example, before switching from manual resection to automatic retraction, the control system 32, 36 may require the tool 30 to reach or collide with the virtual boundary VB (which is indicative of the full cut being completed). Additionally, or alternatively, before switching from manual resection to automatic retraction, the control system 32, 36 may require detection of a start of a manual retraction action, and then take over the retraction action automatically thereafter. In yet another example, automatically repositioning to another cutting plane can be triggered by the control system 32, 36 detecting that a requisite amount of material removed from the current target plane 58. To implement the above-described techniques, any combinations of pre-defined behaviors, situational contexts, or completion of a step or steps can be utilized with any combinations of surgical actions described herein.

F. Anatomical Considerations for Manual/Automated Surgical Actions

One additional input or variable which may alter the behavior of the manipulator 20 in performing any of the above-described manual/automated surgical actions involves tracking, sensing, imaging, or modelling of the bone or soft tissue of the surgical site. The bone and/or soft tissue can be imaged preoperatively or intraoperatively using any imaging modality, e.g., CT scan, X-ray, ultrasound, machine vision, etc. In some cases, the imaging data of the bone and/or soft tissue can be converted to a 3D model, shape model, mesh, or point cloud. Segmentation processes can be utilized to convert slices of the imaging data to a model. The soft tissue can be identified to determine sensitive structure surrounding the bone. These structures may be ligaments, surrounding soft tissue, or the incision of the surgical site. Surgical plans can be developed relative to the bone or soft tissue models and the navigation system can be utilized to register models to the actual patient anatomy. In some cases, an imageless registration technique can be utilized wherein the pointer (P) is used to digitize various points on the bone or soft tissue parts to intraoperatively form a model.

The incision of the patient can also be tracked using the navigation system and a virtual boundary can be associated with the incision. Tracking of the incision could be implemented by tracking elements that are coupled to retractors that hold the incision open or by using a fiber optic cable that is attached to the skin around the incision opening. In another example, a machine vision system can be utilized to track the incision. The machine vision system can be implemented as a camera coupled to the manipulator 20 and/or the localizer. In one implementation, the machine vision system identifies the incision opening or images and identifies surrounding retractors to enable creation of a virtual constraint boundary associated with the incision. In another implementation, the machine vision system is utilized with the navigation system. The machine vision system images the soft tissue and bone in the coordinate system of the machine vision camera. The navigation system tracks the bone in the localizer coordinate system. The localizer data is combined with the machine vision image data into a common coordinate system and merged to identify data points in the image data that have coordinates located outside registered bone model. These outside coordinates are indicative of soft tissue surrounding the bone. A virtual object can be associated with the soft tissue to define a region outside of the bone region that is to be avoided by the cutting tool 30. Incision tracking utilized by the techniques described herein can be like that described in U.S. Pat. No. 9,603,665, entitled, "Systems And Methods For Establishing Virtual Constraint Boundaries", or like that described in U.S. Pat. No. 10,667,868, entitled "System And Methods For Performing Surgery On A Patient At A Target Site Defined By A Virtual Object".

In one implementation, the navigation probe (P) is utilized to intraoperatively define virtual boundaries. This technique may be useful for soft tissue structures, such as ligaments, the patella, or the incision opening. The probe (P) is tracked by the navigation system and the points which are digitized or touched by the probe tip are recorded. The operator can utilize the user interface UI, display, or controls on the probe (P) to trigger or record touch points. A computer model of the anatomical site and movement of the probe (P) relative to the site can be shown on the display. Once a sufficient number of points have been recorded, the soft tissue boundary can be established. This technique can be performed with or without directly or continually tracking the anatomy. For example, when the anatomy is not tracked, the soft tissue boundary can be re-established using the pointer (P) if the operator determines that the anatomy has moved from the last registration. If the bone is tracked, the relationship between the soft tissue boundary and the bone can be established and maintained should the anatomy move.

By understanding the relationship between the soft tissue or incision and the bone to be treated, the control system 32, 36 can provide an additional input to manage or control the above-described actions of the cutting tool 30, namely, alignment to the target plane, resection, retraction, and pose change of the cutting tool 30. For example, a virtual boundary associated with the soft tissue may alter how the tool 30 is reoriented in either mode. In the automated mode, the soft tissue boundary may provide a constraint which causes the control system 32, 36 to redefine the allowable reorientation of the tool 30 between resection cuts to avoid collisions with the soft tissue. In the manual mode, the soft tissue boundary may operate as a virtual boundary to constrain movement of the tool 30 from meeting or exceeding the boundary or deactivate the tool 30.

Furthermore, in some implementations, resection of the anatomy with the cutting tool can be monitored without utilizing a bone model or directly tracking the bone with the navigation system. Here, the incision area may be identified using any of the above techniques. The surgical system can employ one or more sensors to detect when the cutting tool 30 has been fully inserted into the bone region. The sensor(s) can detect a change in power to the cutting tool 30, monitor the swing of the cutting tool 30 during cutting (e.g., smaller swing when cutting as compared with movement through air), and/or monitor force measurement in the cutting tool 30 and/or manipulator 20. Without using the bone model, the control system 32, 36 can receive sensor measurements to determine or infer the relationship between the cutting tool 30 and the bone. For example, the control system 32, 36 can determine that the cutting tool 30 is entering cortical bone (or the target perimeter), passing through cortical bone, exiting cortical bone (or the target perimeter), or cutting soft tissue. Any of these sensing techniques can be utilized for any of the actions of the cutting tool 30 described above, whether used in the manual or automated modes.

Several implementations have been discussed in the foregoing description. However, the implementations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A robotic surgical system for resection of an anatomy, the robotic surgical system comprising:
    a saw blade configured to resect the anatomy;
    a manipulator being configured to move the saw blade; and
    a control system being configured to:
        associate a target plane with the anatomy, the target plane delineating a portion of the anatomy to be resected from a portion of the anatomy to remain unresected; and
        control the manipulator in an automated mode or a manual mode to;
        align the saw blade to the target plane;
        resect along the target plane with the saw blade;
        retract the saw blade along the target plane; and
    control the manipulator in the automated mode to automatically change an orientation of the saw blade on the target plane while the saw blade remains aligned to the target plane.

2. The robotic surgical system of claim 1, wherein the control system is configured to associate a target perimeter with the anatomy, wherein the target perimeter is located within the target plane and corresponds to a perimeter of a portion of the anatomy.

3. The robotic surgical system of claim 2, wherein the control system is configured to associate a virtual boundary with the anatomy, wherein the virtual boundary is located within the target plane and based on the target perimeter, wherein the manipulator is configured to resect along the target plane with the saw blade in response to the saw blade being located within the virtual boundary, and wherein the manipulator is configured to deactivate or retract the saw blade in response to the meeting or exceeding the virtual boundary.

4. The robotic surgical system of claim 1, wherein the control system is configured to:
    control the manipulator in the manual mode to align the saw blade to the target plane; and
    control the manipulator in the automated mode to:
        automatically resect the anatomy along the target plane with the saw blade;
        automatically retract the saw blade along the target plane; and
        automatically change the orientation of the saw blade on the target plane while the saw blade remains aligned to the target plane.

5. The robotic surgical system of claim 1, wherein the control system is configured to:
    control the manipulator in the manual mode to resect the anatomy along the target plane with the saw blade; and
    control the manipulator in the automated mode to:
        automatically align the saw blade to the target plane;
        automatically retract the saw blade along the target plane; and
        automatically change the orientation of the saw blade on the target plane while the saw blade remains aligned to the target plane.

6. The robotic surgical system of claim 1, wherein the control system is configured to:
    control the manipulator in the manual mode to retract the saw blade along the target plane; and
    control the manipulator in the automated mode to:
        automatically align the saw blade to the target plane;
        automatically resect the anatomy along the target plane with the saw blade; and
        automatically change the orientation of the saw blade on the target plane while the saw blade remains aligned to the target plane.

7. The robotic surgical system of claim 1, wherein the control system is configured to:
    control the manipulator in the manual mode to:
        align the saw blade to the target plane; and
        resect the anatomy along the target plane with the saw blade; and
    control the manipulator in the automated mode to:
        automatically retract the saw blade along the target plane; and
        automatically change the orientation of the saw blade on the target plane while the saw blade remains aligned to the target plane.

8. The robotic surgical system of claim 1, wherein the control system is configured to:
    control the manipulator in the manual mode to:
        align the saw blade to the target plane; and
        retract the saw blade along the target plane; and
    control the manipulator in the automated mode to:
        automatically resect the anatomy along the target plane with the saw blade; and
        automatically change the orientation of the saw blade on the target plane while the saw blade remains aligned to the target plane.

9. The robotic surgical system of claim 1, wherein the control system is configured to:
    control the manipulator in the manual mode to:
        resect the anatomy along the target plane with the saw blade; and
        retract the saw blade along the target plane; and
    control the manipulator in the automated mode to:
        automatically align the saw blade to the target plane; and automatically change the orientation of the saw blade on the target plane while the saw blade remains aligned to the target plane.

10. The robotic surgical system of claim 1, wherein the control system is configured to:
control the manipulator in the manual mode to:
align the saw blade to the target plane;
resect the anatomy along the target plane with the saw blade; and
retract the saw blade along the target plane; and
control the manipulator in the automated mode to:
automatically change the orientation of the saw blade on the target plane while the saw blade remains aligned to the target plane.

11. The robotic surgical system of claim 1, wherein the control system is configured to control the manipulator in the automated mode by automatically moving the saw blade along a predetermined tool path.

12. The robotic surgical system of claim 1, further comprising a force/torque sensor being configured to sense forces/torques applied to the saw blade by an operator, and wherein the control system controls the manipulator in the manual mode by being configured to command movement of the saw blade in response to the sensed forces/torques.

13. The robotic surgical system of claim 1, further comprising a user interface coupled to the control system, and wherein the user interface is configured to enable an operator to selectively pre-assign manual mode control or automated mode control to perform at least one of the following:
align the saw blade to the target plane;
resect the anatomy along the target plane with the saw blade; and
retract the saw blade along the target plane.

14. The robotic surgical system of any claim 13, wherein resection of the anatomy includes performing a plurality of resections wherein each resection is on a target plane that is different than the target planes for the other resections, and for each resection, the user interface is configured to enable an operator to selectively pre-assign manual mode control or automated mode control to perform at least one of the following:
align the saw blade to the target plane;
resect the anatomy along the target plane with the saw blade; and
retract the saw blade along the target plane.

15. The robotic surgical system of claim 1, wherein the control system is configured to automatically and selectively pre-assign manual mode control or automated mode control to perform at least one of the following:
align the saw blade to the target plane;
resect the anatomy along the target plane with the saw blade;
retract the saw blade along the target plane.

16. The robotic surgical system of claim 1, wherein the control system is configured to:
control the manipulator in the manual mode to perform at an action from among the following plurality of actions: align the saw blade to the target plane; resect the anatomy along the target plane with the saw blade; and retract the saw blade along the target plane;
detect occurrence of a predefined behavior of the saw blade during performance of the action; and
in response to detection of the predefined behavior, control the manipulator to automatically switch to a different action from among the plurality of actions.

17. The robotic surgical system of claim 16, wherein, in response to detection of the predefined behavior, the control system is configured to further control the manipulator to automatically switch from the manual mode to the automated mode to automatically perform the different action.

18. A robotic surgical system for resection of an anatomy, the robotic surgical system comprising:
a saw blade configured to resect the anatomy;
a manipulator configured to move the saw blade; and
a control system being configured to:
associate a target plane with the anatomy, the target plane delineating a portion of the anatomy to be resected from a portion of the anatomy to remain unresected; and
control the manipulator in an automated mode to:
automatically align the saw blade to the target plane;
automatically resect the anatomy along the target plane with the saw blade;
automatically retract the saw blade along the target plane; and
automatically change an orientation of the saw blade on the target plane while the saw blade remains aligned to the target plane.

19. A robotic surgical system for resection of an anatomy, the robotic surgical system comprising:
a saw blade configured to resect the anatomy;
a manipulator configured to move the saw blade; and
a control system being configured to:
associate a target plane with the anatomy, the target plane delineating a portion of the anatomy to be resected from a portion of the anatomy to remain unresected; and
control the manipulator in an automated mode to perform at least one of the following:
automatically align the saw blade to the target plane;
automatically resect the anatomy along the target plane with the saw blade; and
automatically retract the saw blade along the target plane; and
control the manipulator in the automated mode to
automatically change an orientation of the saw blade on the target plane while the saw blade remains aligned to the target plane.

20. The robotic surgical system of claim 1, wherein the control system is configured to control the manipulator to automatically change the orientation of the saw blade on the target plane while the saw blade remains aligned to the target plane after controlling the manipulator to retract the saw blade along the target plane.

* * * * *